(12) United States Patent
Gushima et al.

(10) Patent No.: US 8,363,529 B2
(45) Date of Patent: Jan. 29, 2013

(54) OPTICAL DISC RECORDING DEVICE AND RECORDING SIGNAL GENERATING DEVICE

(75) Inventors: Toyoji Gushima, Osaka (JP); Makoto Usui, Osaka (JP); Yuji Takagi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/322,666

(22) PCT Filed: Mar. 24, 2011

(86) PCT No.: PCT/JP2011/001730
§ 371 (c)(1),
(2), (4) Date: Nov. 28, 2011

(87) PCT Pub. No.: WO2011/121948
PCT Pub. Date: Oct. 6, 2011

(65) Prior Publication Data
US 2012/0082018 A1    Apr. 5, 2012

(30) Foreign Application Priority Data
Mar. 29, 2010   (JP) ................................. 2010-074667

(51) Int. Cl.
*G11B 7/00*   (2006.01)
(52) U.S. Cl. .................... 369/59.12; 369/47.48
(58) Field of Classification Search .............. 369/47.1, 369/47.48, 47.18, 47.46, 47.27, 47.28, 59.12, 369/59.11, 53.42, 53.35, 53.34
See application file for complete search history.

(56) References Cited

U.S. PATENT DOCUMENTS

| 6,522,608 | B1 | 2/2003 | Kuroda |
| 7,196,984 | B2 * | 3/2007 | Noda et al. .................. 369/47.19 |
| 7,626,909 | B2 | 12/2009 | Tachino et al. |

(Continued)

FOREIGN PATENT DOCUMENTS

| JP | 2000-357328 | 12/2000 |
| JP | 2002-260339 | 9/2002 |

(Continued)

OTHER PUBLICATIONS

International Search Report issued Jun. 21, 2011 in International (PCT) Application No. PCT/JP2011/001730.

*Primary Examiner* — Nabil Hindi
(74) *Attorney, Agent, or Firm* — Wenderoth, Lind & Ponack, L.L.P.

(57) ABSTRACT

Provided are an optical disc recording device and a recording signal generating device which enable to correct displacement between a reproducing position of a reproduction signal from a concave-convex mark preformed in an optical disc, and a recording position of second information to be recorded in synchronism with the reproduction signal, and stably and speedily record the second information. A digital signal processor (202) specifies a reproducing position in the concave-convex mark, using a reproduction signal and a channel clock. A recording signal generator (211) generates a recording signal alternately including a plurality of additionally recordable data, each of which includes second information and has a predetermined length, and a plurality of dummy data. A recording position controller (110) detects a recording position displacement amount representing a displacement amount between the reproducing position and a recording position of the additionally recordable data, using the reproducing position and the reading signal. A recording length adjustor (208) increases or decreases the recording length of dummy data in accordance with the recording position displacement amount.

11 Claims, 13 Drawing Sheets

U.S. PATENT DOCUMENTS

| | | |
|---|---|---|
| 2003/0002406 A1 | 1/2003 | Deguchi et al. |
| 2003/0002408 A1 | 1/2003 | Kuroda |
| 2003/0031101 A1 | 2/2003 | Kuroda |
| 2003/0039186 A1 | 2/2003 | Kuroda |
| 2004/0030983 A1 | 2/2004 | Tomita |
| 2004/0047252 A1 | 3/2004 | Miyatake et al. |
| 2006/0023601 A1 | 2/2006 | Tachino et al. |
| 2007/0109933 A1 | 5/2007 | Takao et al. |
| 2009/0196140 A1 | 8/2009 | Yamaoka et al. |
| 2011/0007616 A1 | 1/2011 | Yamaoka et al. |

FOREIGN PATENT DOCUMENTS

| | | |
|---|---|---|
| JP | 2004-30848 | 1/2004 |
| JP | 3753169 | 12/2005 |
| JP | 3961338 | 5/2007 |
| WO | 02/39434 | 5/2002 |
| WO | 2005/059903 | 6/2005 |
| WO | 2007/139077 | 12/2007 |
| WO | 2009/113271 | 9/2009 |

\* cited by examiner

OPTICAL DISC RECORDING DEVICE AND RECORDING SIGNAL GENERATING DEVICE

TECHNICAL FIELD

The present invention relates to an optical disc recording device for recording information on an optical disc, and a recording signal generating device for generating a recording signal for use in recording information on an optical disc.

BACKGROUND ART

In recent years, optical discs as represented by DVDs and Blu-ray discs are widely used as inexpensive and portable information recording media, and an optical disc recording device configured to additionally record data on optical discs such as DVD-Rs and BD-Rs as recordable information recording media has been put into practical use.

The optical disc recording device of this type is configured such that a light beam is irradiated onto a guide groove (a groove) or onto a prepit of a concave-and-convex shape which has been preformed in a track of an optical disc, and information (an address) on the track of the optical disc is acquired, using a reproduction signal to be obtained based on reflected light from the guide groove or from the prepit.

Further, the optical disc is constructed such that the guide groove is wobbled at a predetermined cycle. The optical disc recording device is configured such that a light beam is irradiated onto a rotating optical disc, and a signal component corresponding to the cycle of the wobble is extracted, using a reproduction signal to be obtained based on reflected light from the guide groove. The optical disc recording device acquires a timing signal at which data is to be recorded i.e. a recording clock signal by applying a signal processing such as PLL (Phase Locked Loop) to the extracted signal component.

Furthermore, generally, a block constituting an error-correction code is used as a base unit for the recording unit of data. The optical disc recording device performs a recording operation of data in the unit of blocks, referring to a position on a track correlated to position information.

For instance, a recording operation onto DVD-R is performed using a recording clock signal which is synchronized with a wobble, referring to position information acquired based on a reproduction signal from a prepit (a land prepit) of a concave-and-convex shape. Blocks are directly connected to each other, and data is sequentially written in the blocks. Accordingly, in the case where data is newly recorded on an optical disc in which data has already been recorded, an extremely high-precision recording position control is required so that discontinuity such as data interruption or data overwriting may not occur in a portion where already-recorded data and data to be newly recorded are written and connected to each other.

Heretofore, there have been proposed various techniques, as techniques for realizing high-precision recording position control at a portion where two data are written and connected to each other (see e.g. patent literature 1 and patent literature 2).

In the information recording device disclosed in patent literature 1, in additionally recording new data, the phase of a clock signal for a writing operation is synchronized with the phase of a clock signal for a reproducing operation of written data, and then, the frequency of the writing clock signal is recovered to a frequency unique to the writing clock signal at a predetermined time constant for avoiding generation of phase displacement at a portion where two data are written and connected to each other.

The optical disc device disclosed in patent literature 2 is configured such that a displacement amount between the position where data has been recorded and the position where the data is to be recorded is detected, and the frequency of a recording clock is controlled in such a manner as to eliminate displacement between the position at which the trailing end of new data is recorded, and the position at which the trailing end of new data is to be recorded in recording the new data. With this arrangement, the recording position of new data is adjusted, and accumulation of recording position displacement is avoided.

FIG. 13 is a diagram showing a configuration of the conventional optical disc device disclosed in patent literature 2. In the following, only the elements in the conventional optical disc device that are related to the invention are described.

The first timer 801 has a first counter that increments the count value by one in synchronism with a recording clock. The count value of the first counter is preset to a predetermined value (F) in response to a prepit sync detection signal, without depending on the state (an activated state or a non-activated state) of a recording gate signal.

The second timer 802 has a second counter that increments the count value by one in synchronism with a recording clock. The count value of the second counter is preset to a predetermined value (G) in response to a data sync detection signal, as far as the recording gate signal is in a non-activated state.

The subtractor 803 outputs a difference signal indicating a difference between the value of the first timer 801 and the value of the second timer 802.

The filter 29 restricts a time change amount of the difference signal to be outputted from the subtractor 803, and outputs a difference signal containing the restricted time change amount to the PLL 30, as a correction amount signal.

The PLL 30 controls the frequency of the recording clock in such a manner that the correction amount signal is approximated to zero level (in other words, the difference between the value of the first timer 801 and the value of the second timer 802 is set to "0").

In this way, new data is recorded, referring to a data sync detection signal in a portion where previously recorded data and data to be newly recorded are connected to each other. With this arrangement, it is possible to secure continuity between the previously recorded data and the data to be newly recorded. Further, even if the previously recorded data is displaced from the position where the data is to be recorded, the displacement amount is detected, and the frequency of a recording clock is controlled in accordance with the detected displacement amount. Thus, there is no likelihood that displacement of a recording position may remain.

Further, there has also been proposed a technique, wherein a buffer area is formed in a portion where the blocks are connected to each other so as to lower the demand of precisely positioning the recording position, and the data format is revised in such a manner as to eliminate a clearance between the blocks by overlapping the recording end of a preceding block and the recording start of a succeeding block with each other in the buffer area (see e.g. patent literature 3).

On the other hand, as disclosed in patent literature 4, there has been proposed a technique, wherein a reflection film is formed on a concave-convex mark preformed in accordance with modulated main information, and an additionally recordable mark is formed by irradiating laser light at an interval longer than the period corresponding to a longest mark of the concave-convex mark for changing the optical characteristic of the reflection film, whereby sub information synchronized with the main information is recorded in a superimposed manner.

All the techniques disclosed in patent literatures 1 through 3 have been proposed based on the premise that a recording clock signal is obtained with respect to a wobbled groove which has been preformed in a track. The technique disclosed in patent literature 4 has been proposed based on the premise that a recording clock signal is obtained with respect to a preformed concave-convex mark.

The conventional optical disc devices as described above have the following drawbacks to overcome.

In the arrangement disclosed in patent literature 1, although continuity in a portion where previously recorded data and new data are written and connected to each other can be secured, the positional displacement amount of the previously recorded data is carried to the new data, and positional displacement of recording data based on position information derived from a wobble or a prepit cannot be eliminated.

In the arrangement disclosed in patent literature 2, the frequency of a recording clock is corrected in such a manner that recording position displacement is eliminated at the recording end of new data, based on the positional displacement detection amount on recorded data. However, in the case where the frequency of a recording clock becomes unstable during a recording operation of new data, it is impossible to eliminate recording position displacement that may newly occur.

In the arrangement disclosed in patent literature 3, it is possible to avoid generation of a blank portion in a boundary portion between recording end of a preceding block and recording start of a succeeding block by forming a buffer area which overlaps the preceding block and the succeeding block. However, it is impossible to avoid generation of a blank portion that cannot be absorbed by forming an overlap portion of a predetermined length or to avoid generation of data overwriting in a portion between preceding and succeeding blocks that cannot be absorbed in the buffer area, at the recording end position, in the case where recording position displacement over the length of the overlap portion has occurred, or in the case where recording position displacement over the length of the buffer area has occurred, during an operation of sequentially recording new data in blocks.

In the arrangement disclosed in patent literature 4, it is required to reproduce position information from a concave-and-convex pit for obtaining a recording clock signal. As a result, as compared with a case where a recording clock signal is obtained from a continuous wobbled groove, a frequency displacement of a recording clock signal is likely to occur with respect to a defect on an optical disc or with respect to deterioration of S/N ratio of a reproduction signal.

Further, the S/N ratio of a reproduction signal is deteriorated, because the light amount of reflected light from an optical disc is also changed during a period when the light intensity of laser light is modulated, as a recording operation is proceeded. In particular, since the light intensity of laser light is modulated for a period longer than the period corresponding to a longest mark of the concave-convex mark, the S/N ratio of a reproduction signal may be intermittently deteriorated during a recording operation, with the result that the forming position of an additionally recordable mark may be displaced.

CITATION LIST

Patent Literature

Patent literature 1: Japanese Patent No. 3,753,169
Patent literature 2: Japanese Patent No. 3,961,338
Patent literature 3: Japanese Unexamined Patent Publication No. 2004-30848
Patent literature 4: International Unexamined Patent Publication No. 2007/139077

SUMMARY OF INVENTION

An object of the invention is to provide an optical disc recording device and a recording signal generating device which enable to correct displacement between the reproducing position of a reproduction signal from a concave-convex mark formed on an optical disc, and the recording position of second information to be recorded in synchronism with the reproduction signal, and to stably and speedily record the second information.

An optical disc recording device according to an aspect of the invention is an optical disc recording device for recording, on an optical disc recorded with first information in the form of a concave-convex mark, second information different from the first information. A recording unit of the concave-convex mark includes a plurality of data areas in which the first information is recorded, and a plurality of linking areas, each of which is disposed between the adjacent ones of the data areas. The optical disc recording device includes a reproduction signal extractor which extracts a reproduction signal, based on reflected light from the concave-convex mark irradiated with a light beam; a clock reproducer which reproduces a channel clock synchronized with a channel bit length of the concave-convex mark, using the reproduction signal extracted by the reproduction signal extractor; a signal processor which specifies a reproducing position in the concave-convex mark, using the reproduction signal extracted by the reproduction signal extractor, and using the channel clock reproduced by the channel clock reproducer; a recording signal generator which generates a recording signal alternately including a plurality of additionally recordable data, each of which includes the second information and has a predetermined length, and a plurality of dummy data; a recorder which records the second information in synchronism with the concave-convex mark by modulating a light intensity of the light beam in accordance with the recording signal generated by the recording signal generator, and by irradiating the light beam of the modulated light intensity onto a reflection film formed on the concave-convex mark of the optical disc for changing an optical characteristic of the reflection film; a recording position displacement amount detector which detects a recording position displacement amount representing a displacement amount between the reproducing position and a recording position of the additionally recordable data, using the reproducing position specified by the signal processor, and using the recording signal generated by the recording signal generator; and a dummy data recording length controller which increases or decreases a recording length of the dummy data in accordance with the recording position displacement amount detected by the recording position displacement amount detector.

In the above arrangement, the recording unit of the concave-convex mark includes a plurality of data areas in which the first information is recorded, and a plurality of linking areas, each of which is disposed between the adjacent ones of the data areas. The reproduction signal extractor extracts a reproduction signal, based on reflected light from the concave-convex mark irradiated with a light beam. The clock reproducer reproduces a channel clock synchronized with a channel bit length of the concave-convex mark, using the reproduction signal extracted by the reproduction signal extractor. The signal processor specifies a reproducing position in the concave-convex mark, using the reproduction signal extracted by the reproduction signal extractor, and using the channel clock reproduced by the channel clock reproducer. The recording signal generator generates a recording signal alternately including a plurality of additionally recordable data, each of which includes the second information and has a predetermined length, and a plurality of dummy data. The recorder records the second information in synchronism with the concave-convex mark by modulating a light intensity of the light beam in accordance with the recording signal generated by the recording signal generator, and by irradiating the light beam of the modulated light intensity onto a reflection film formed on the concave-convex mark of the optical disc for changing an optical characteristic of the reflection film. The recording position displacement amount detector detects a recording position displacement amount representing a displacement amount between the reproducing position and a recording position of the additionally recordable data, using the reproducing position specified by the signal processor, and using the recording signal generated by the recording signal generator. The dummy data recording length controller increases or decreases a recording length of the dummy data in accordance with the recording position displacement amount detected by the recording position displacement amount detector.

According to the invention, it is possible to correct a displacement between a reproducing position of a reproduction signal from a concave-convex mark preformed in an optical disc, and a recording position of additionally recordable data to be recorded in synchronism with the reproduction signal, and to stably and speedily record second information.

These and other objects, features and advantages of the present invention will become more apparent upon reading the following detailed description along with the accompanying drawings.

DESCRIPTION OF EMBODIMENTS

In the following, embodiments of the invention are described referring to the accompanying drawings. The following embodiments are merely examples embodying the invention, and do not limit the technical feature of the invention.

First Embodiment

In the following, a preferred embodiment is described as the first embodiment of the invention.

Specifically, an optical disc recording device is configured such that a light beam is irradiated onto an optical disc recorded with first information in the form of an optically readable concave-convex mark, and second information is recorded in a state that the light beam is focused on the concave-convex mark. Firstly, the optical disc recording device acquires a reproduction signal by optically reading the concave-convex mark, based on reflected light from the optical disc irradiated with the light beam. Then, the optical disc recording device reproduces a channel clock synchronized with the concave-convex mark, using the reproduction signal; and generates a recording signal including second information, using the reproduced channel clock. Then, the optical disc recording device records the second information by modulating the light intensity of the light beam to be irradiated onto the optical disc, using the generated recording signal.

Further, the optical disc recording device detects a recording position displacement amount, using the reproduction signal, during a recording operation of the second information; and increases or decreases the recording length of dummy data included in the recording signal in accordance with the detected recording position displacement amount. Thus, it is possible to correct displacement of the recording position during a recording operation, which is a feature of the first embodiment of the invention.

Figure 1:
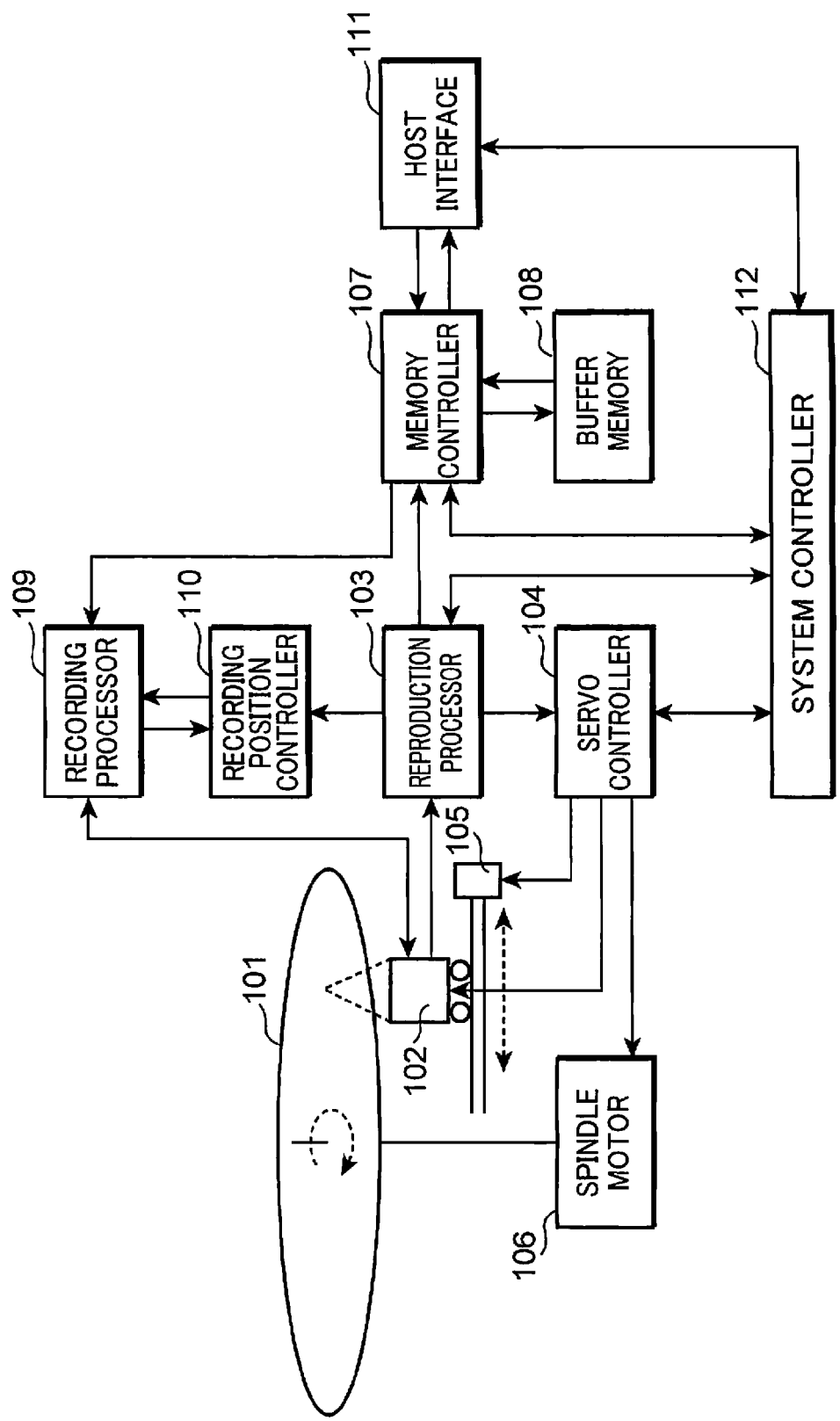
FIG. 1 is a block diagram showing a configuration example of an optical disc recording device in the first embodiment of the invention.

FIG. 1 is a block diagram showing a configuration example of the optical disc recording device in the first embodiment of the invention. The optical disc recording device shown in FIG. 1 is provided with an optical pickup 102, a reproduction processor 103, a servo controller 104, a traverse motor 105, a spindle motor 106, a memory controller 107, a buffer memory 108, a recording processor 109, a recording position controller 110, a host interface 111 and a system controller 112.

The optical pickup 102 reads first information recorded on an optical disc 101, as a reproduction signal. Then, the optical pickup 102 physically or chemically changes a recording layer of the optical disc 101 by irradiating a light beam onto the optical disc 101 for recording second information different from the first information. Although not illustrated, the optical pickup 102 includes a light source device for emitting a light beam, an optical system including an objective lens for collecting the light beam emitted from the light source device on a recording layer of the optical disc 101, an actuator for moving the objective lens in a focus direction and in a radial direction, and a light detecting device for receiving light reflected on the recording layer on which the light beam is collected to change the received reflected light into an electrical signal.

The reproduction processor 103 acquires a servo error signal necessary for causing the light beam to focus on the recording layer of the optical disc 101 and the light beam to follow a predetermined track on the optical disc 101, using the electrical signal outputted from the light detecting device in the optical pickup 102. Further, the reproduction processor 103 extracts a reproduction signal of the recorded first information, and obtains address information indicating the position of a track, as well as reproduction data, while applying a predetermined signal processing such as demodulation and synchronization to the reproduction signal.

Upon receiving the servo error signal from the reproduction processor 103, the servo controller 104 performs focus control and tracking control so that the light beam follows an intended track by driving the actuator in the optical pickup 102. Further, the servo controller 104 rotates the optical disc 101 at a predetermined cycle by driving the spindle motor 106, and moves the optical pickup 102 in a radial direction so that the light beam accesses the intended track by driving the traverse motor 105.

The memory controller 107 receives reproduction data from the reproduction processor 103 at the time of reproducing the data from the optical disc 101, and writes the data to be stored into the buffer memory 108. Further, the memory controller 107 reads out information to be transmitted to an external device, from the buffer memory 108, to satisfy a transmission request from the external device that has been received via the host interface 111; and outputs the readout information to the host interface 111. On the other hand, at the time of recording second information on the optical disc 101, the memory controller 107 receives the second information from the external device via the host interface 111, and writes the received second information into the buffer memory 108. Further, the memory controller 107 reads out the data (second information) to be recorded on the optical disc 101 from the buffer memory 108, and outputs the readout data to the recording processor 109.

Upon receiving the data to be recorded on the optical disc 101 from the memory controller 107, the recording processor 109 generates a recording signal that has undergone a signal processing necessary for recording onto the optical disc 101 such as error-correction encoding, attaching an identification ID, attaching a synchronizing signal and performing modulation; and outputs the generated recording signal to the optical pickup 102.

The optical pickup 102 records the second information on the optical disc 101 by changing the light amount of a light beam to be emitted from the built-in light source device in accordance with a recording signal from the recording processor 109. For instance, in the case where the light source device is a laser diode, the optical pickup 102 may be provided with a driver circuit for driving the laser diode to change the laser light power in accordance with a recording signal.

The host interface 111 receives a command from the external device; and receives, from the external device, data including the second information to be recorded on the optical disc 101. Further, the host interface 111 transmits, to the external device, reproduction data or status information.

The system controller 112 interprets the command received from the external device via the host interface 111. For instance, upon receiving a write command requesting recording information in a predetermined address of the optical disc 101, the system controller 112 controls the memory controller 107 to temporarily store data including information to be recorded into the buffer memory 108 via the host interface 111, and controls the respective functional blocks such as the servo controller 104, the memory controller 107 and the recording processor 109, based on the address information from the reproduction processor 103. In this way, the system controller 112 controls the entirety of the system so that the optical disc recording device is organically operated in accordance with a command, whereby intended information is recorded on the optical disc 101.

The recording position controller 110 controls output of a recording signal by the recording processor 109, based on a reproduction signal from the reproduction processor 103, to properly keep the recording position in recording data including second information in synchronism with the concave-convex mark pre-recorded in a track of the optical disc 101. The recording position control to be performed in the case where recording position displacement has occurred, which is a feature of the invention, will be described later in detail.

Figure 2:
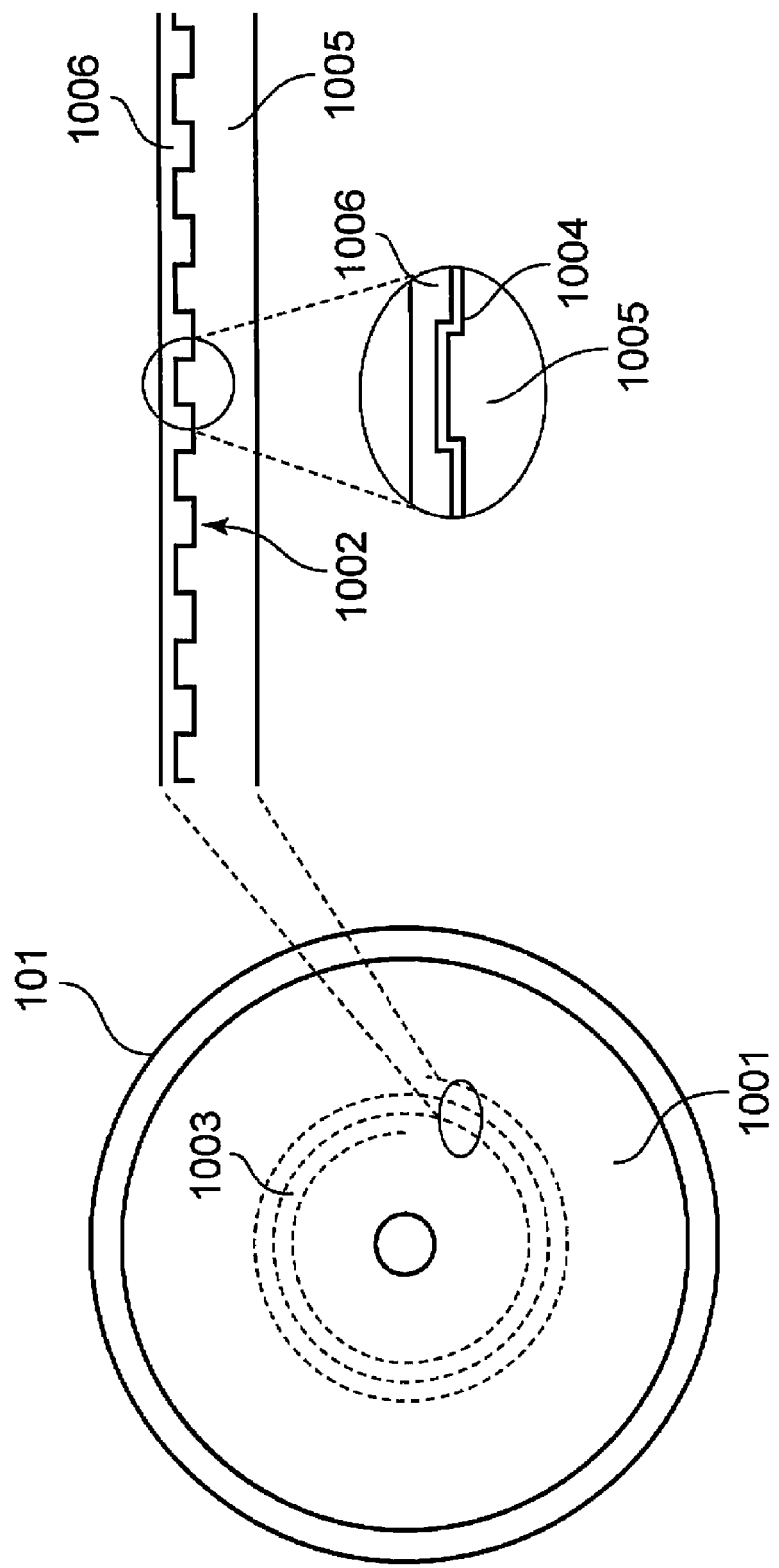
FIG. 2 is a schematic diagram showing a construction example of an optical disc in the first embodiment of the invention.

FIG. 2 is a schematic diagram showing a construction example of the optical disc 101 in the first embodiment of the invention.

First information is pre-recorded, in the form of a concave-convex mark 1002, on a recording surface 1001 of the optical disc 101. The concave-convex mark 1002 which is aligned in the circumferential direction of the optical disc 101 constitutes a track 1003 in the form of a spiral. The track 1003 is formed over the entirety of the recording surface 1001 with a predetermined track pitch in the radial direction.

As shown by an enlarged partial sectional view in FIG. 2, the optical disc 101 is manufactured by forming a reflection film 1004 on a disc substrate 1005 where the concave-convex mark 1002 is transferred by vapor deposition, and by forming a cover layer 1006 on the reflection film 1004.

Although not illustrated, at least a part of the track 1003 is capable of recording second information in synchronism with the concave-convex mark 1002.

The reproduction processor 103 acquires a clock signal to be synchronized with the first information pre-recorded on the optical disc, and address information by reproducing the concave-convex mark 1002. The recording processor 109 retrieves an area where second information is to be recorded, based on the acquired address information; and generates a recording signal including the second information, using the acquired clock signal.

A clock signal is reproduced, using a PLL (Phase Locked Loop) section. Specifically, the reproduction processor 103 acquires changing point (edge) information of the concave-convex mark 1002 based on a reproduction signal, and controls the PLL section to lock the phase of a clock signal to the phase of the edge information. By performing the above operation, a clock signal synchronized with the concave-convex mark 1002 is obtained.

The optical pickup 102 records second information based on a generated recording signal. An example as to how the second information is recorded is disclosed in patent literature 4. Specifically, the optical pickup 102 modulates the light intensity of a light beam in accordance with a recording signal generated by the recording processor 109, and irradiates a light beam whose light intensity has been modulated onto the reflection film 1004 formed on the concave-convex mark of the optical disc 101 for changing the optical characteristic of the reflection film 1004 to record second information in synchronism with the concave-convex mark.

Figure 3:
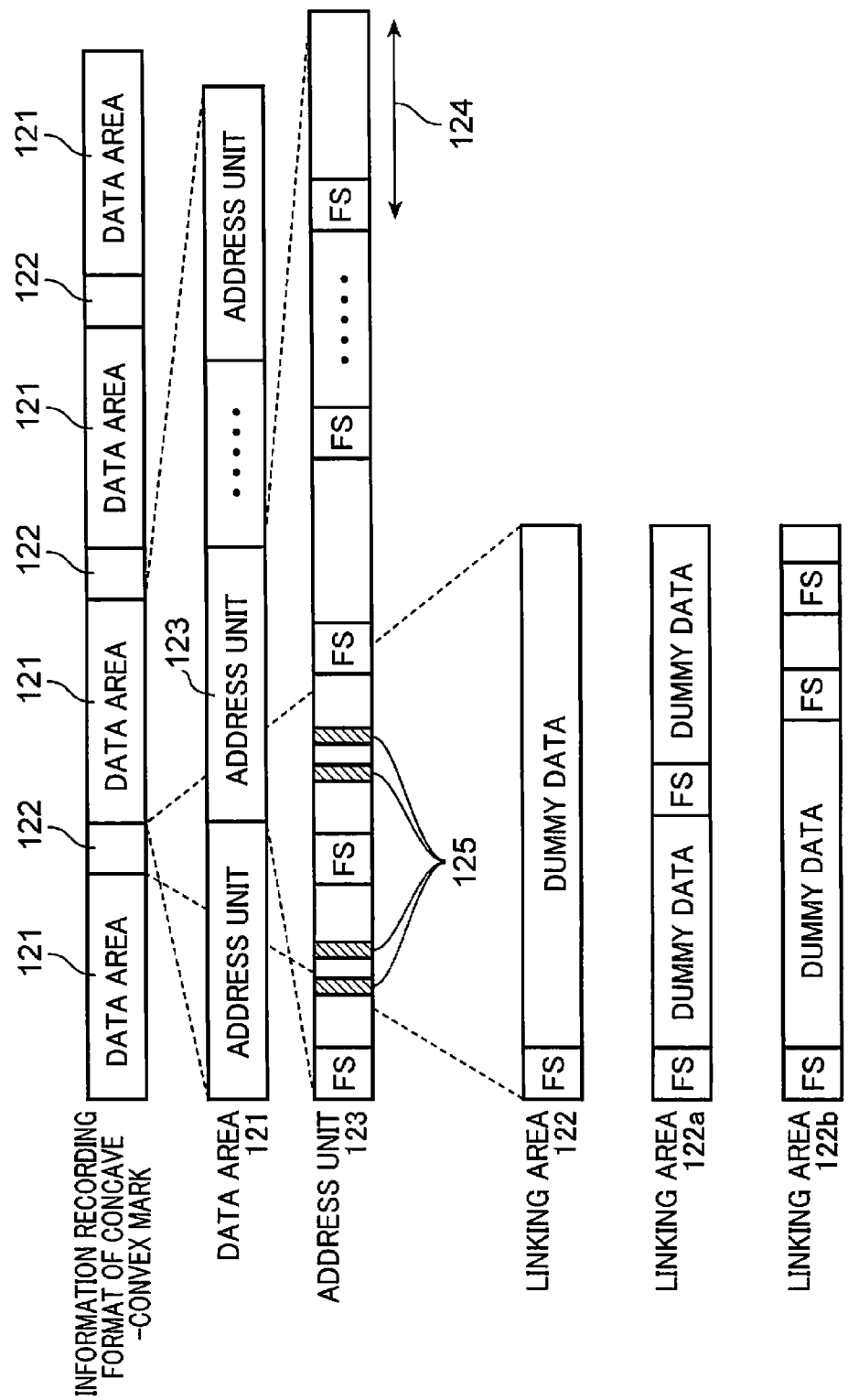
FIG. 3 is a diagram showing an example of an information recording format of the optical disc in the first embodiment of the invention.

FIG. 3 is a diagram showing an example of an information recording format of the optical disc 101 in the first embodiment of the invention.

The information recording format of the concave-convex mark shown in FIG. 3 indicates a part of the spiral track 1003 formed by aligning the concave-convex mark 1002 in the circumferential direction. The recording unit of the concave-convex mark including the first information is constituted of plural data areas 121 in which the first information is recorded, and plural linking areas 122 for linking the data areas adjacent to each other.

As shown in FIG. 3, each of the data areas 121 is constituted of plural address units 123, and each of the address units 123 is constituted of a predetermined number of frames 124. Each of the frames 124 includes a frame sync FS at the leading end thereof, and includes a unique pattern distinguishable from the other ones. Further, some of the frames 124 include address data 125. Each of the data areas 121 in the optical disc 101 is configured such that address information representing the absolute position of each data area 121 is identifiable by reproducing the address data 125.

The address information included in the address data 125 may have one-to-one correspondence to each one of the data areas 121, or plural address information may be allocated in one data area 121.

Although not illustrated, the frame sync FS may include plural kinds of ID information distinguishable one from another, and the plural kinds of ID information are arranged in a unique order so that each frame is identifiable as to which frame number the each frame belongs to in the data area.

Data included in each data area 121 has one-to-one correspondence to a unit block constituting an error-correction code. Error detection or error-correction encoding is performed for user information of a predetermined byte number by a predetermined rule, and a data sorting processing i.e. an interleave processing is performed by a predetermined rule so that data is distributed and allocated in frames 124 of a predetermined number, which are included in each data area 121.

The data which has undergone e.g. error-correction encoding as described above is then subjected to a modulation processing based on a modulation rule suitable for recording and reproducing on and from the optical disc 101, and the modulated data is recorded as the concave-convex mark 1002 on the optical disc 101 after a frame sync FS is attached to the leading end of each frame 124.

A well-known modulation rule suitable for recording and reproducing on and from the optical disc 101 is run-length limited encoding. The run-length limited encoding is also called as (d,k) limited encoding. According to (d,k) limited encoding, the number of symbols "0" which exist between the symbols "1" in a channel data stream constituted of the symbols "1" and the symbols "0" is limited from "d" to "k" (where d, k is a positive integer, and satisfies a relation: d<k). Data is recorded by converting binary data into a channel data stream that meets the requirement on (d,k) limit, using a predetermined conversion table, and by correlating the symbols "1" in the channel data stream to a changing point (an edge) of a concave-convex mark. By performing the recording operation as described above, it is possible to limit the length of the concave-convex mark in a range between the (d+1)-channel bit length and the (k+1)-channel bit length.

By performing the above operation, it is possible to reproduce a clock signal synchronized with the edge of the concave-convex mark 1002 based on a reproduction signal, and to obtain a clock signal using only the concave-convex mark 1002 for reproducing data. Further, it is possible to easily define the shortest length of the concave-convex mark 1002 by the (d+1)-channel bit length, which enables to perform high-density recording by revising the conversion rule.

Further, a signal obtained by converting channel data corresponding to the odd-numbered symbols "1" and the symbols "0" that follow the odd-numbered symbols "1", which are included in the channel data stream, into HIGH level; and by converting channel data corresponding to the even-numbered symbols "1" and the symbols "0" that follow the even-numbered symbols "1", which are included in the channel data stream, into LOW level is called as an NRZI (Non Return to Zero Inverted) signal. Further, a value obtained by integrating the channel data in the unit of channel bits, while setting the HIGH level of an NRZI signal to +1, and setting the LOW level of an NRZI signal to −1, is called as DSV (Digital Sum Value). It is preferable to revise the conversion rule so that the DSV is approximated to zero. In other words, in the case where the HIGH level is correlated to a convex portion (a pit), and the LOW level is correlated to a concave portion (a land), it is possible to approximate the existence probabilities of concave portions and convex portions in a concave- and convex mark to 50% respectively by approximating the DSV to zero. In this way, a direct-current component included in an NRZI signal can be suppressed, and a low-frequency component included in a reproduction signal can be eliminated. Thus, it is possible to generate a signal necessary for reproduction in a narrow band, which is advantageous in setting the S/N ratio.

Here, a preferred example of numerical value parameters for the respective elements is described.

Let it be assumed that one data area 121 is constituted of sixteen address units 123, one address unit 123 is constituted of thirty-one frames 124, and user information included in one data area 121 is 64 kilobytes. One address unit 123 and one address information have one-to-one correspondence, and each one of address information is attached to each one of sixteen address unit 123 included in one data area 121 in a sequential order. Data to be recorded is modulated by using the run-length limited encoding where d=1 and k=7. In other words, the length of the concave-convex mark 1002 is limited to the range between 2-channel bit length and 8-channel bit length.

One frame 124 is constituted of 1,932 channel bits. A frame sync FS constituted of 30 channel bits is attached to the leading end of each frame 124. Each frame sync FS includes a unique pattern section in which the 9-channel bit length that is not included in the channel data stream is included two times; and a sync ID section that is distinguishable from a sync ID section in the other frame syncs FS. Seven kinds of frame syncs FS0, FS1, FS2, FS3, FS4, FS5, FS6 are defined by sync ID patterns different from each other.

As described above, by setting the channel bit number of each frame 124 to a fixed number, and by including a unique pattern that is not included in the channel data stream into the frame sync FS, it is possible to easily detect the leading end of each frame, which enables to establish frame synchronization at the time of reproduction.

The frame sync FS0 is disposed in the leading frame of each address unit 123, and six kinds of frame syncs FS1 through FS6 are disposed in the remaining thirty frames of each address unit 123 in a unique order. This enables to identify as to which frame number the frame belongs to in each address unit 123 by using the frame sync FR or plural sequential frame sync IDs.

With the provision of the above arrangements, it is possible to easily and reliably reproduce data included in the data areas 121.

The address data 125 and error-correction codes for address data are distributed and recorded at predetermined byte positions of two leading frames in each address unit 123. Decoding the address data 125 enables to acquire address information.

As shown in FIG. 3, a linking area 122 includes a frame sync FS at the leading end thereof, and includes dummy data in the remaining portion thereof. The linking area 122 has a role that the linking area 122 indicates a linking position between adjacent data areas 121, a role that the linking area 122 is used in an operation such as a high-speed pulling operation or re-synchronization in a reproduction signal processing such as PLL, and a role that the linking area 122 makes it easy to perform recording position control of second information which will be described later.

The linking area 122 also contributes to making the information recording formats of a read-only disc and a recordable disc identical to each other in construction. In other words, in the case of a recordable disc, the linking area 122 is utilized as a buffer area via which information is sequentially written by the optical disc recording device. In the case of a read-only disc, a common reproduction circuit may be used for the read-only disc and for the recordable disc by making the read-only disc and the recordable disc identical to each other in construction. This avoids an increase in the manufacturing cost of the device.

It is preferable to set the length of the linking area 122 to an integral multiple of the frame length. With the above arrangement, there is no likelihood that frame synchronization that has been established in a preceding data area 121 may be impaired, even if a linking area 122 is interposed between the adjacent data areas. This eliminates the need of performing frame synchronization again in a data area 121 that follows the preceding data area 121.

Although not illustrated, the frame sync FS included in the linking area 122 may include a sync ID pattern (e.g. a frame sync FS7) which is different from the frame sync FS in the data area 121.

Further, preferably, the linking area 122 may not include user information (first information). As described above, the linking area 122 is regarded as an area independent of the data area 121 by recording user information in such a manner that the user information is included in the data area 121. For instance, the linking area 122 may include information which is correlated to a data area 121 succeeding the linking area 122, as dummy data; or the linking area 122 may serve as an element for strengthening reproduction synchronization of a data area 121 that follows the linking area 122.

The concave-convex mark formed in the data area has a length equal to an integral multiple of the channel clock length T, is limited to the range of the shortest mark length pT and the longest mark length qT (where p, q is a positive integer, and satisfies a relation: p<q), and is formed based on a predetermined modulation rule. The linking area includes a predetermined repeating pattern that does not depend on the predetermined modulation rule.

Preferably, the dummy data may have a predetermined repeating pattern that does not depend on the rule of the modulation code constituting a channel bit stream in the data area 121. For instance, the dummy data may be obtained by repeating a specific pattern corresponding to 30T (=3T+3T+5T+5T+7T+7T).

The above arrangement is advantageous in performing e.g. a high-speed pulling processing of PLL by utilizing a repeating cycle of a specific pattern, because the abovementioned pattern generates an edge of a concave-convex mark at a predetermined cycle. Further, the above arrangement is advantageous in suppressing variation of a low-frequency component of a reproduction signal, because the DSV becomes zero. Furthermore, the above arrangement is advantageous in suppressing an influence on amplitude lowering of a reproduction signal and on deterioration of S/N ratio, because the abovementioned pattern does not include the shortest mark length 2T that depends on the rule of the modulation code for the data area 121. In addition, the abovementioned pattern includes three kinds of concave-convex marks, whose 2-channel bit lengths are different from each other, i.e. 3T, 5T and 7T. Therefore, it is also possible to obtain a likelihood with respect to error detection of a pattern, and to obtain a reproduction signal whose amplitude differs depending on the length of a concave-convex mark. Thus, the above arrangement is also applicable to adaptive equalization of an equalizer, and enables to strengthen the quality of signal processing for reproduction from a data area 121 succeeding a data area 121 where recording position displacement has occurred.

A linking area 122a shown in FIG. 3 shows another example of the linking area. Specifically, the linking area 122a has two frames, each of which is constituted of a frame sync FS and dummy data, and the length of the linking area 122a is equal to the total length of the two frames. Further, although not illustrated, the two frame syncs FS may differ from each other, and a sync ID pattern (e.g. a frame sync FS7 and a frame sync FS8) which differs from all the frame syncs FS in the data area 121 may be included.

With the above arrangement, a unique pattern appears again in the linking area 122a at a portion advanced from the leading end by one-frame length. Accordingly, there is no likelihood that frame synchronization that has been established in a preceding data area 121 may be impaired, despite that the linking area 122a is constituted of plural frames; and it is possible to strengthen frame synchronization in a data area 121 succeeding a data area 121 where recording position displacement has occurred.

A linking area 122b shown in FIG. 3 shows yet another example of the linking area. Specifically, the linking area 122b includes a frame sync FS at the leading end thereof, and two frame syncs FS in the vicinity of the trailing end thereof. With this arrangement, it is possible to make the linking area of a read-only disc and the linking area of a recordable disc identical to each other in construction. Specifically, in the case of a recordable disc, it is possible to start a recording operation in the vicinity of an intermediate portion of the linking area 122b, and it is possible to strengthen the synchronization performance at the time of reproduction by utilizing the frame syncs FS at the leading end and the trailing end of the linking area 122b.

Figure 4:
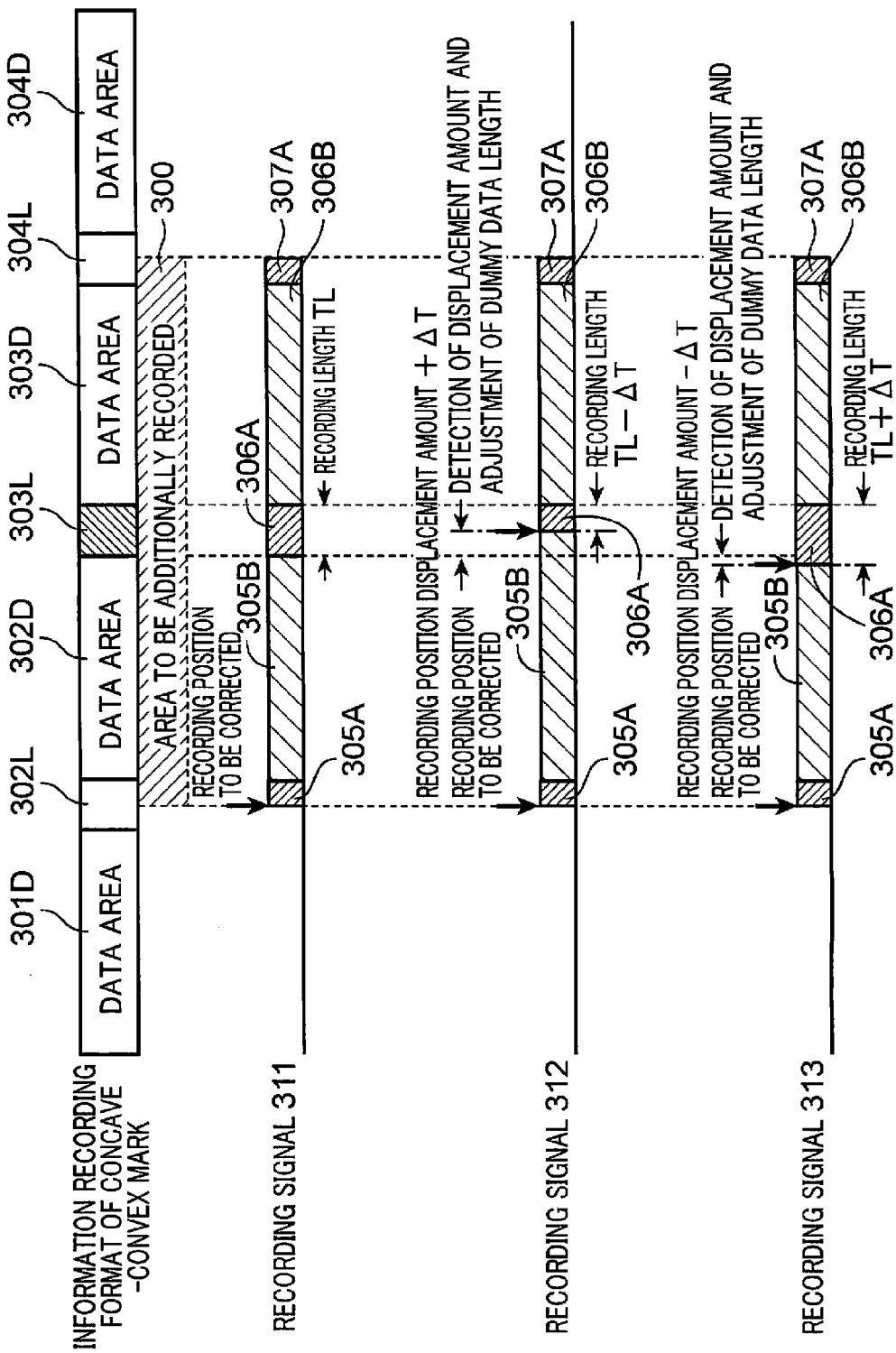
FIG. 4 is a diagram for describing a recording signal generation processing of generating a recording signal for use in recording second information on the optical disc.

Next, an operation to be performed by the optical disc recording device shown in FIG. 1 of recording second information on the optical disc 101, particularly, a recording signal generation processing of generating a recording signal for use in recording second information, is described referring to FIG. 4 in the following. FIG. 4 is a diagram for describing the recording signal generation processing of generating a recording signal for use in recording second information on the optical disc.

The information recording format in the form of a concave-convex mark shown in FIG. 4 indicates a format of a base track, in which first information is pre-recorded by a concave-convex mark; and an area 300 in which second information is to be additionally recorded is shown beneath the information recording format in the form of a concave-convex mark. The information recording format in the form of a concave-convex mark shown in FIG. 4 is configured such that data areas 301D, 302D, 303D, 304D, and linking areas 302L, 303L, 304L are alternately disposed. The details of the information recording format in the form of a concave-convex mark are described as above referring to FIG. 3, and description thereof is omitted herein.

Firstly, the concave-convex mark is read by causing a light beam to follow a predetermined track on the rotating optical disc 101, thereby reproducing the address data attached to each data area. Then, second information is recorded at a predetermined address in the unit of recording blocks, based on the reproduced address data. Here, the recording block is defined as a recording unit for second information, and one recording block has a length equal to the length of an area which is constituted of one data area, a latter half of a linking area immediately preceding the one data area, and a former half of a linking area immediately succeeding the one data area.

Referring to FIG. 4, a manner as to how second information corresponding to the length of two recording blocks is additionally recorded is exemplarily shown. An area where two recording blocks are sequentially recorded, in other words, an area which includes the two data areas 302D, 303D, the latter half of the linking area 302L immediately preceding the data area 302D, the entirety of the linking area 303L between the data area 302D and the area 303D, and the former half of the liking area 304L immediately succeeding the data area 303D is defined as the area 300 where second information is to be additionally recorded.

A recording signal 311 in FIG. 4 has a recording signal format corresponding to the length of two recording blocks in a normal state. The normal state, in other words, represents a state that the phase of a clock signal obtained by using the PLL, based on a reproduction signal obtained by reproducing a track, is properly locked without being displaced from a concave-convex mark even during a recording operation of second information.

One recording block serves as a recording unit of information which includes additionally recordable data including second information, and dummy data of a predetermined length that precedes and succeeds the additionally recordable data. Accordingly, as shown in FIG. 4, the recording signal 311 configured such that two recording blocks are sequentially recorded includes, in the order from starting a recording operation, dummy data 305A, additionally recordable data 305B, dummy data 306A, additionally recordable data 306B and dummy data 307A.

In this example, the length of the additionally recordable data 305B and of the additionally recordable data 306B corresponds to the length of the data area 302D and of the data area 303D in a base track. Further, the length (a recording length) TL of the dummy data 306A which is interposed between the two additionally recordable data 305B and 306B corresponds to the length of the linking area 303L.

Further, the recording processor 109 recognizes the position of a light beam on a track, using the reproduced address data or frame sync, during a time when the light beam follows the data area 301D immediately preceding the data area 302D, or a data area (not shown) preceding the data area 301D; and controls the light beam so that a recording signal is started to be outputted from an intermediate position (e.g. at a time upon lapse of 0.5×TL after start of tracking the linking area 302L) in the linking area 302L, using a clock signal. By performing the above operation, a recording start timing is determined.

A method for determining a recording start timing will be described later in detail.

As described above, it is possible to record second information in synchronism with a concave-convex mark on a base track by making one-to-one correspondence between the information recording format in the form of a concave-convex mark on the base track, and the recording signal format of the second information.

A recording signal 312 in FIG. 4 indicates a recording signal, in the case where the phase locking of PLL is unlocked during a recording operation, and the frequency of a clock signal is temporarily shifted toward a low frequency region with respect to the channel frequency of a concave-convex mark. In particular, here, described is a case where phase locking of PLL is temporarily unlocked in the data area 302D which appears first after starting a recording operation, the PLL is recovered in the data area 302D, and then, frame synchronization and address information reproduction are properly performed.

In this case, the output timing of a recording signal is started to be delayed, resulting from shifting of the frequency of a clock signal toward a low frequency region, and the recording position of second information is displaced in rearward direction (in a timewise delayed direction), as the output timing is delayed. Then, the recording position controller 110 is operable to detect the displacement in output timing of a recording signal, in other words, detect a recording position displacement amount at a point of time when the PLL is recovered and frame synchronization is established again, and the frame number or the address information is recognizable.

A feature of the first embodiment of the invention resides in correcting recording position displacement by increasing or decreasing the recording length of dummy data in accordance with a detected recording position displacement amount.

In other words, the recording processor 109 adjusts the recording length of the dummy data 306A immediately succeeding the additionally recordable data 305B so that the recording length is equal to a value (TL−ΔT) which is obtained by subtracting ΔT from the normal recording length TL, assuming that the detected recording position displacement amount is +ΔT (a detection value in a direction in which the recording position is delayed is a positive value).

By performing the above operation, even if recording position displacement has occurred in the data area 302D, it is possible to coincide the output start timing of the additionally recordable data 306B with the recording start position of the data area 303D succeeding the data area 302D where the recording position displacement has occurred, whereby accumulation of recording position displacement can be prevented.

A recording signal 313 in FIG. 4 indicates a recording signal, in the case where phase locking of PLL is unlocked during a recording operation, and the frequency of a clock signal is temporarily shifted toward a high frequency region with respect to the channel frequency of a concave-convex mark. In particular, in this example, described is a case where phase locking of PLL is temporarily unlocked in the data area 302D which appears first after starting a recording operation, the PLL is recovered in the data area 302D, and then frame synchronization and address information reproduction are properly performed.

In this case, the output timing of a recording signal is started to be advanced, resulting from shifting of the frequency of a clock signal toward a high frequency region, and the recording position of second information is displaced in forward direction (in a timewise advanced direction), as the output timing is advanced. Then, the recording position controller 110 is operable to detect the displacement in output timing of a recording signal, in other words, detect a recording position displacement amount at a point of time when the PLL is recovered and frame synchronization is established again, and the frame number or the address information is recognizable.

In other words, the recording processor 109 adjusts the recording length of the dummy data 306A immediately succeeding the additionally recordable data 305B so that the recording length is equal to a value (TL+$\Delta$T) which is obtained by adding $\Delta$T to the normal recording length TL, assuming that the detected recording position displacement amount is −$\Delta$T (a detection value in a direction in which the recording position is advanced is a negative value).

By performing the above operation, even if recording position displacement has occurred in the data area 302D, it is possible to coincide the output start timing of the additionally recordable data 306B with the recording start position of the data area 303D succeeding the data area 302D where the recording position displacement has occurred, whereby accumulation of recording position displacement can be prevented.

As described above, it is possible to properly correct the recording position of additionally recordable data so that the recording position of additionally recordable data is optimized in a data area succeeding the data area where recording position displacement has occurred, by increasing or decreasing the output length (a recording length) of dummy data succeeding the additionally recordable data where recording position displacement has occurred, in accordance with a detected recording position displacement amount during a recording operation.

The recording position correction processing can be implemented without temporarily interrupting recording of second information. Accordingly, the above arrangement is advantageous in reducing a time required for recording second information, as compared with a method, wherein recording of second information is temporarily interrupted, and a recording operation is performed again by performing tracking/focusing control of a light beam again.

Although not illustrated in the first embodiment, in the case where the absolute value of the recording position displacement amount $\Delta$T exceeds the normal recording length TL of dummy data, it is impossible to recover the device to a proper recording position state by merely correcting the recording length of one dummy data. In such a case, it is appropriate to temporarily interrupt the recording operation, and to start recording second information again for avoiding continuation of the recording position displacement state. In other words, it is desirable to correct the recording length of dummy data for continuation of recording second information in a condition where TL$\geq\Delta$T, and to stop output of a recording signal in an area succeeding dummy data for interruption of a recording operation in a condition where TL<$\Delta$T.

It should be noted, however, even in a condition where TL<$\Delta$T, in the case where the value of ($\Delta$T−TL) is very small, in other words, in the case where a recording position displacement amount remaining after a one-time adjustment of the recording length of dummy data is negligibly small, it may be possible to completely remove the recording position displacement amount without interrupting a recording operation by retaining the recording position displacement amount that remains after the one-time adjustment of the recording length of dummy data, and by adjusting the recording length of next dummy data in accordance with the retained remaining recording position displacement amount at a timing when the next dummy data is inserted.

Further, the recording position controller 110 may judge whether the absolute value of the recording position displacement amount $\Delta$T has exceeded a predetermined threshold value; and in the case where the absolute value of the recording position displacement amount $\Delta$T is judged to have exceeded the predetermined threshold value, the judgment result may be notified to a higher-order processing block such as the system controller 112, and judgment may be made in a software manner as to whether recording of second information should be stopped, or recording of second information should be continued while performing the recording position correction processing. As a notification method in performing the above operation, there is proposed a method, wherein a recording position displacement amount or the absolute value of a recording position displacement amount is asserted, and a microprocessor periodically detects the asserted value; or a method, wherein an interruption signal indicating recording position anomaly is notified to a microprocessor, in the case where the recording position displacement amount has exceeded a predetermined threshold value.

In this example, a recording signal generating device in the first embodiment of the invention is described.

Specifically, the optical disc recording device is configured such that a light beam is irradiated onto an optical disc recorded with first information in the form of an optically readable concave-convex mark, while changing the light intensity, and second information is recorded in a state that the light beam is focused on the concave-convex mark. The optical disc recording device includes a recording signal generating device for generating a recording signal for controlling the modulation of the light intensity.

In the optical disc recording device for recording second information different from first information in synchronism with a concave-convex mark by modulating a light intensity of a light beam to be irradiated onto a reflection film formed on the concave-convex mark, using a reproduction signal to be reproduced from an optical disc recorded with the first information in the form of the concave-convex mark for changing an optical characteristic of the reflection film, the recording signal generating device is adapted to generate a recording signal for controlling the modulation of the light intensity.

The recording signal generating device reproduces a channel clock synchronized with a concave-convex mark, using a reproduction signal from the optical disc, and detects a recording position displacement amount, using the reproduction signal, while generating a recording signal including second information, using the channel clock. Then, the recording signal generating device increases or decreases the recording length of dummy data included in the recording signal in accordance with the detected recording position displacement amount. By performing the above operation, the recording signal generating device is operable to correct recording position displacement during a recording operation, which is a feature of the invention.

Figure 5:
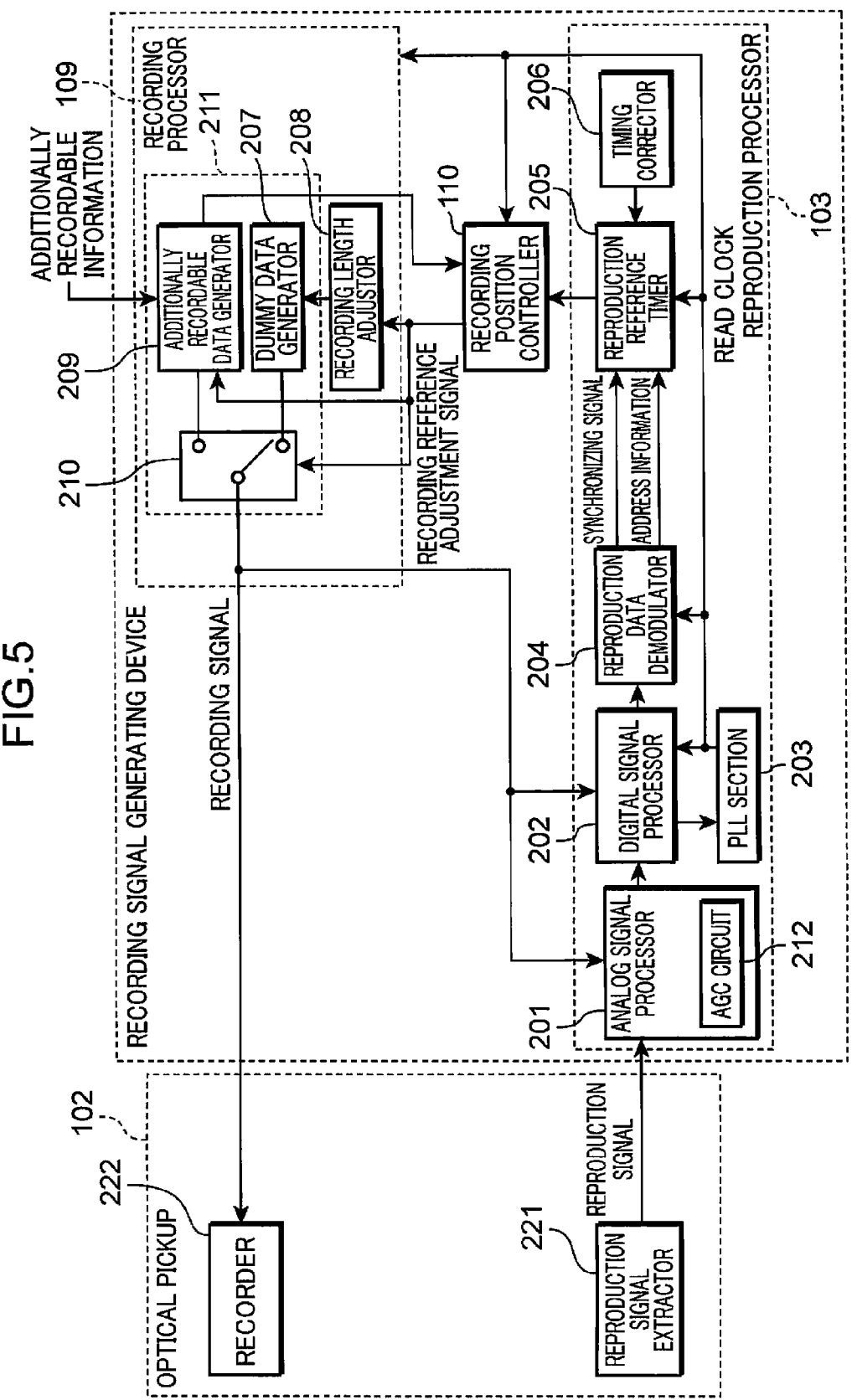
FIG. 5 is a block diagram showing a detailed configuration example of a recording signal generating device in the first embodiment of the invention.

FIG. 5 is a block diagram showing a detailed configuration example of the recording signal generating device in the first embodiment of the invention.

The recording signal generating device constitutes a part of the optical disc recording device described referring to FIG. 1, and includes at least the functional blocks corresponding to the reproduction processor 103, the recording processor 109 and the recording position controller 110.

The recording signal generating device is suitable for implementing an integrated circuit (LSI) implementable by a semiconductor. Specifically, the recording signal generating device implements, by a semiconductor circuit, the function i.e. a series of operations from inputting a reproduction signal i.e. an electrical signal to be outputted from the optical pickup 102 in optically reproducing a track on the optical disc 101 by the optical pickup 102, to outputting a recording signal i.e. an electrical signal for controlling modulation of the light intensity to the optical pickup 102 in recording second information by modulating the light intensity of the light beam to be irradiated onto a track of the optical disc 101 by the optical pickup 102, as described referring to FIG. 1.

Alternatively, the recording signal generating device may be implemented as a system LSI, which is configured such that a part or all of the functions such as the memory controller 107 for controlling data readout and writing from and into the buffer memory 108, the servo controller 104 for controlling rotation of the optical disc 101 and light beam tracking by the optical pickup 102, the host interface 111 for controlling a command to or from an external device, or data transmission and receiving to and from the external device, and the system controller 112 constituted by using e.g. a microprocessor or a software for organically operating the entirety of the optical disc recording device, as peripheral blocks, are packaged in one semiconductor chip on the basis of the aforementioned function as a primary block. Further alternatively, the recording signal generating device may be configured such that a buffer memory 108 implementable by e.g. a DRAM is loaded in one semiconductor chip with other elements, or the recording signal generating device may be implemented as a system LSI, in which a buffer memory 108 is sealed in one package.

In the following, a concrete configuration example of the recording signal generating device in the embodiment of the invention is described referring to FIG. 5.

The optical pickup 102 is provided with a reproduction signal extractor 221 and a recorder 222. As described above, the optical pickup 102 is provided with the elements other than the reproduction signal extractor 221 and the recorder 222. However, in FIG. 5, only the reproduction signal extractor 221 and the recorder 222 are shown.

The reproduction signal extractor 221 extracts a reproduction signal, based on reflected light from a concave-convex mark irradiated with a light beam.

The reproduction processor 103 includes an analog signal processor 201, a digital signal processor 202, a PLL section 203, a reproduction data demodulator 204, a reproduction reference timer 205 and a timing corrector 206.

Upon receiving a reproduction signal outputted from the reproduction signal extractor 221, the analog signal processor 201 transmits, to the digital signal processor 202, an analog reproduction signal which has undergone a signal processing of amplifying or filtering a signal component necessary for reproducing at least the concave-convex mark. An AGC circuit 212 included in the analog signal processor 201 will be described later.

The digital signal processor 202 converts an analog signal into a digital signal, using e.g. an AD converter; extracts a signal corresponding to a changing point (an edge) of the concave-convex mark, and transmits the extracted signal to the PLL section 203.

The PLL section 203 reproduces a read clock i.e. a clock signal synchronized with an edge of the concave-convex mark and with the channel frequency by comparing between the phase of a signal corresponding to the edge of the concave-convex mark and the phase of the clock signal. The PLL section 203 reproduces a channel clock synchronized with the channel bit length of the concave-convex mark, using the reproduction signal extracted by the reproduction signal extractor 221. The PLL section 203 outputs the reproduced read clock to the digital signal processor 202, the reproduction data demodulator 204, the reproduction reference timer 205, the recording position controller 110 and the recording processor 109.

The read clock reproduced by the PLL section 203 is inputted again to the digital signal processor 202. The digital signal processor 202 generates and outputs a channel bit stream corresponding to the reproduced concave-convex mark, using the read clock reproduced by the PLL section 203. The digital signal processor 202 specifies a reproducing position in the concave-convex mark, using the reproduction signal extracted by the reproduction signal extractor 221, and the read clock (a channel clock) reproduced by the PLL section 203.

The data area includes at least one synchronization pattern data, and at least one position information data. The digital signal processor 202 specifies a reproducing position, using the synchronization pattern data and the position information data detected based on a reproduction signal. Alternatively, the digital signal processor 202 may specify a reproducing position by interpolating synchronization pattern data or position information data, using a channel clock, in the case where it is impossible to read synchronization pattern data or position information data.

Upon receiving a read clock and a channel bit stream, the reproduction data demodulator 204 detects a unique pattern of a frame sync FS which appears at an interval corresponding to a predetermined clock number, and outputs a synchronizing signal synchronized with the leading end of each frame in the channel bit stream. Further, the reproduction data demodulator 204 recognizes a frame position (a frame number) in an address unit, using the identification ID included in the frame sync FS; reproduces address data included in the leading frame and in the second frame of the address unit; and outputs the reproduced address data as address information.

Upon receiving a read clock from the PLL section 203, and receiving a synchronizing signal and address information from the reproduction data demodulator 204, the reproduction reference timer 205 recognizes the address unit number in each data area, the frame number in each address unit, and the channel clock number counted from the leading end of each frame. Specifically, the reproduction reference timer 205 is provided with an address unit counter representing the address unit number counted from the leading end of each data area, a frame counter representing the frame number counted from the leading end of each address unit, and a channel clock counter representing the channel clock number counted from the leading end of each frame. The reproduction reference timer 205 outputs each counter value, as recognition information on a current position based on a reproduction signal, by presetting and incrementing the each counter value, using address information, a synchronizing signal, and a read clock.

The timing corrector 206 is operable to update a counter value included in the reproduction reference timer 205 by repeating a preset operation and an increment operation at a predetermined timing and by performing an interpolation processing, even if address information is not temporarily obtainable resulting from an error in a reproduction signal, or even if a synchronizing signal is fluctuated. Further, the timing corrector 206 corrects the recognition information on a current position by updating the each counter value based on address information and synchronizing signal that have been acquired again, in the case where the error in the reproduction signal has been eliminated, accurate address information is obtained again, and a synchronizing signal is inputted at an accurate cycle.

As described above, the reproduction reference timer 205 outputs, to the recording position controller 110, each counter value i.e. recognition information on a current position that is timely updated.

The recording position controller 110 detects a recording position displacement amount, using an output from the reproduction reference timer 205, generates a recording reference adjustment signal in accordance with the detected recording position displacement amount, and outputs the generated recording reference adjustment signal to the recording processor 109.

The recording processor 109 is provided with a recording length adjustor 208 and a recording signal generator 211. The recording signal generator 211 includes a dummy data generator 207, an additionally recordable data generator 209 and a recording data selector 210.

The read clock outputted from the PLL section 203 is also supplied to the recording processor 109 and to the recording position controller 110. The recording signal and the recording reference adjustment signal are basically generated in synchronism with the read clock.

The dummy data generator 207 generates and outputs a predetermined dummy data pattern.

The recording signal generator 211 generates a recording signal which alternately includes a plurality of additionally recordable data including second information, and a plurality of dummy data.

The recording position controller 110 detects a recording position displacement amount representing a displacement amount between a reproducing position and a recording position of additionally recordable data, using the reproducing position specified by the digital signal processor 202, and a recording signal generated by the recording signal generator 211.

The recording position controller 110 detects a recording position displacement amount by comparing between a recording end position of additionally recordable data to be recorded in correspondence to a data area, and a leading position of a linking area immediately succeeding and adjacent to the data area, at a timing when output of the additionally recordable data of a predetermined length, which is included in the recording signal generated by the recording signal generator 211, is ended.

The recording length adjustor 208 adjusts the recording length (an output length) of dummy data to be generated by the dummy data generator 207 in accordance with a timing of a recording reference adjustment signal. The recording length adjustor 208 increases or decreases the recording length of dummy data in accordance with a recording position displacement amount detected by the recording position controller 110.

Assuming that dT is the length of dummy data (where d is a positive integer, T is a channel clock length), eT is a recording position displacement amount detected by the recording position controller 110 (where e is a positive integer, T is a channel clock length), the recording length adjustor 208 corrects the recording length of dummy data to (d−e)×T in the case where d≧e, and the recording length adjustor 208 stops output of a recording signal succeeding the dummy data for interruption of a recording operation in the case where d<e.

Upon receiving additionally recordable information including second information from the memory controller 107, the additionally recordable data generator 209 converts the received additionally recordable information into a data format suitable for reliably recording and reproducing on and from the optical disc by applying e.g. error-correction encoding and modulation encoding to the received additionally recordable information, and outputs the converted data as additionally recordable data.

The recording data selector 210 switches the device between a state that either one of dummy data outputted from the dummy data generator 207 and additionally recordable data outputted from the additionally recordable data generator 209 is selected and outputted as a recording signal, and a state that neither of the dummy data and the additionally recordable data is selected and a recording signal is not outputted, in accordance with a timing of a recording reference adjustment signal.

The recorder 222 modulates the light intensity of the light beam in accordance with a recording signal generated by the recording signal generator 211, irradiates the light beam whose light intensity has been modulated onto a reflection film formed on the concave-convex mark of the optical disc for changing the optical characteristic of the reflection film, thereby recording second information in synchronism with the concave-convex mark.

In this embodiment, the reproduction signal extractor 221 corresponds to an example of a reproduction signal extractor, the PLL section 203 corresponds to an example of a clock reproducer, the analog signal processor 201 and the digital signal processor 202 correspond to an example of a signal processor, the recording signal generator 211 corresponds to an example of a recording signal generator, the recorder 222 corresponds to an example of a recorder, the recording position controller 110 corresponds to an example of a recording position displacement amount detector, the recording length adjustor 208 corresponds to an example of a dummy data recording length controller, and the AGC circuit 212 corresponds to an example of an automatic gain controller.

Figure 6:
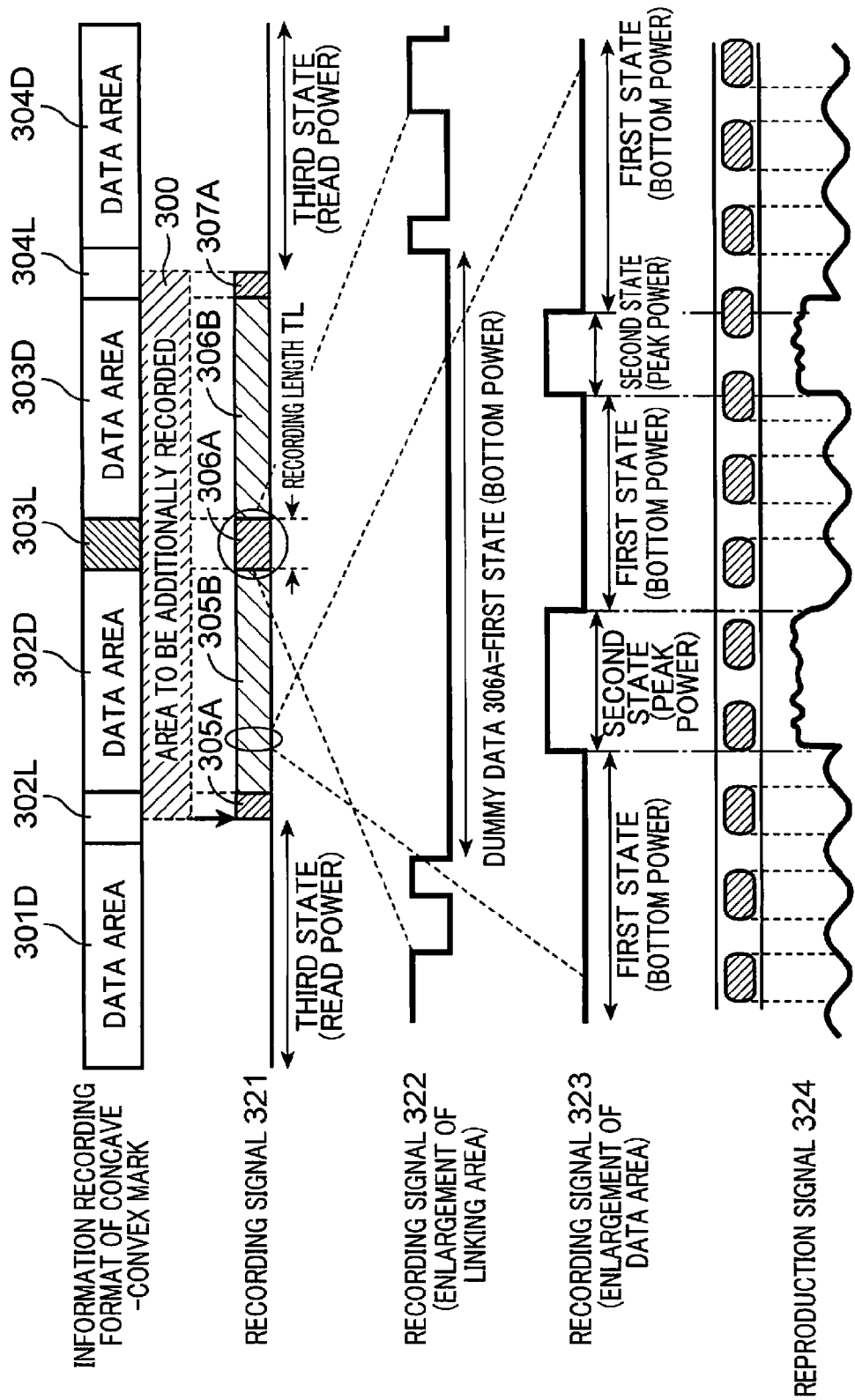
FIG. 6 is a timing chart showing an output example of a recording signal to be generated by a recording signal generator.

FIG. 6 is a timing chart showing an output example of a recording signal to be generated by the recording signal generator.

A recording signal 321 in FIG. 6 shows an output example of a recording signal, in the case where an operation of recording data in two consecutive data areas is performed in such a manner that data is sequentially recorded in the two consecutive data areas 302D, 303D as represented by the area 300 to be additionally recorded.

The recording signal 321 includes, in the order from starting a recording operation, dummy data 305A, additionally recordable data 305B, dummy data 306A, additionally recordable data 306B and dummy data 307A.

In this example, the length of the additionally recordable data 305B and 306B corresponds to the length of the data area 302D and 303D in the base track. Further, the recording length TL of the dummy data 306A which is interposed between the two additionally recordable data corresponds to the length of the linking area 303L.

In this example, the recording signal is defined as a digital signal having a first state, a second state and a third state. The recording operation has the first state and the second state during a recording operation, wherein the first state corresponds to a light intensity of a low power, and the second state corresponds to a light intensity of a high power. Specifically, the recording signal alternately includes a first state signal corresponding to a first light intensity in which the optical characteristic of a reflection film is not changed, and a second state signal corresponding to a second light intensity in which the optical characteristic of a reflection film is changed. At least a part of the dummy data is constituted of the first state signal. An additionally recordable mark is generated by causing a change in the reflection film of the optical disc 101 at a timing when a recording signal having the second state is outputted. Further, the third state indicates that the device is in an operation other than a recording operation, in other words, the device is in a reproducing operation. When the recording signal is in the third state, the light intensity is adjusted to a read power suitable for reading the concave-convex mark on the base track.

A recording signal 322 in FIG. 6 and a recording signal 323 in FIG. 6 are each an enlarged portion of the recording signal 321 shown in FIG. 6. The recording signal 322 in FIG. 6 is an enlarged portion of dummy data to be recorded in a linking area, and the recording signal 323 in FIG. 6 is an enlarged portion of additionally recordable data to be recorded in a data area. The recording signal 322 in FIG. 6 and the recording signal 323 in FIG. 6 are each a digital signal such that the first state signal is set to LOW level, and the second state signal is set to HIGH level. The LOW level corresponds to a light intensity of a low power (a bottom power), and the HIGH level corresponds to a light intensity of a high power (a peak power). An additionally recordable mark is generated by causing a change in the reflection film of the optical disc 101 at a portion where a light beam of a peak power is irradiated. Alternatively, one additionally recordable mark may be formed by irradiating a light beam of a fixed high power (a peak power) when the recording signal is in the second state. Further alternatively, although not illustrated, an additionally recordable mark may be generated by modulating the light intensity in such a manner that a light beam of a peak power is irradiated as multiple pulses.

Further alternatively, conversely to the above, the bottom power corresponding to LOW level may be an irradiation power of a light beam suitable for reading the concave-convex mark on the base track, without causing a change in the reflection film even during a recording operation. The bottom power may have the same light intensity as the light intensity of reproduction power.

By performing the above operation, it is possible to read the edge information of the concave-convex mark from a portion onto which a light beam is irradiated with a bottom power even during a recording operation. Accordingly, it is possible to reproduce the synchronizing signal and the address information, utilizing a period when the first state signal is outputted. Thus, it is possible to recognize a reproducing position during a recording operation, thereby enabling to detect a recording position displacement amount.

Further, as shown by the recording signal 322 in FIG. 6, it is preferable to set at least a part of the dummy data 306A in the first state where the reflectance is not changed. With the above arrangement, in correcting recording position displacement, the recording position displacement correction control can be performed without adversely affecting an operation of generating an additionally recordable mark by changing the reflectance, because only a time corresponding to a state where the reflectance is not changed is changed, even though the recording length of dummy data is changed.

Further, setting at least a part of dummy data to the first state where the reflectance is not changed provided another advantage. During a period when dummy data is recorded, there is no change in the light intensity, and a fixed power is obtained. Accordingly, the above arrangement enables to prevent intrusion of recording noise into a reproduction signal from the concave-convex mark, which is obtained during the period when dummy data is recorded. Thus, it is possible to stably recognize a reproducing position in the concave-convex mark, using a reproduction signal to be obtained when the recording signal is in the first state, even during a recording operation.

An area where dummy data has been recorded is an area where the reflectance of the reflection film has not been changed, even in reproducing the concave-convex mark in an area where additional recording processing has been performed. Accordingly, there is no likelihood that a signal component representing a reflectance variation of the reflection film may be superimposed on a reproduction signal from the concave-convex mark.

Further, the recording period of dummy data corresponds to a linking area on the base track. Accordingly, in the case where the concave-concave mark in a linking area is formed by utilizing repetition of a specific pattern as described referring to FIG. 3, the advantage of the aforementioned method is maximally obtained. In other words, it is possible to prevent an adverse effect on a pulling operation in a reproduction signal processing utilizing repetition of a specific pattern, even in a period when an operation of reproducing a track after an additional recording processing is performed, even if the device is in an operation of additionally recording second information.

A reproduction signal 324 in FIG. 6 shows a state of a reproduction signal from the concave-convex mark on the base track during a recording operation of forming an additionally recordable mark, using the recording signal 323 shown in FIG. 6. It is extremely difficult to obtain a reproduction signal component (edge information) from a concave-convex mark, because a noise component of a recording signal is intolerably large during a period when a light beam is irradiated with a high power or during a period when the light intensity is modulated.

As a result, if automatic amplitude adjustment control such as AGC (automatic gain control) or a clock reproduction processing such as PLL is performed without any revision is during a period when a light beam is irradiated with a high power, the PLL may be unstable resulting from an influence of recording noise, which increases a likelihood that phase locking may be unlocked.

To prevent the above drawback, it is preferable to temporarily stop a phase synchronizing operation of a reproduction signal by PLL, or to temporarily stop AGC control operation at least during a period when a light beam of a high power is irradiated using the second state signal. As shown in FIG. 5, the arrow extending from the recording data selector 210 toward the analog signal processor 201 and the digital signal processor 202 represents a signal having the above role.

The PLL section 203 temporarily stops a phase control operation of a channel clock by interrupting a phase synchronizing operation of a reproduction signal at least during a period when a light beam of the second light intensity is irradiated using the second state signal.

The analog signal processor 201 includes the AGC circuit 212. The AGC circuit 212 performs an automatic gain control operation to suppress amplitude variation of a reproduction signal. The AGC circuit 212 stops the automatic gain control operation of the reproduction signal at least during a period when a light beam of the second light intensity is irradiated. The PLL section 203 reproduces a channel clock, using the reproduction signal to be controlled by the AGC circuit 212. The digital signal processor 202 specifies a reproducing position, using the reproduction signal to be controlled by the AGC circuit 212.

The AGC circuit 212 in the analog signal processor 201 detects a change in the amplitude of the reproduction signal during a reproducing operation when a recording operation is not performed and in the first state where dummy data is recorded; and automatically adjusts the gain of an amplitude amplification circuit in such a manner that the amplitude is approximated to a predetermined target amplitude of the reproduction signal. By performing the above operation, it is possible to suppress a variation in the amplitude of the reproduction signal, resulting from e.g. a reflectance difference between optical discs, plane displacement of a recording surface and track decentering.

On the other hand, the AGC circuit 212 stops the automatic gain control operation of the reproduction signal during a period when the second state signal corresponding to the second light intensity which causes a change in the optical characteristic of a reflection film is inputted. By performing the above operation, it is possible to prevent deterioration of SN ratio of the reproduction signal by erroneous gain adjustment for a reproduction signal resulting from recording noise, even if the recording noise is temporarily intruded into the reproduction signal by an influence of irradiation of a light beam of a high power. Thus, a reproduction signal whose amplitude has been controlled by the AGC circuit 212 is inputted to the digital signal processor 202.

Further, the digital signal processor 202 temporarily stops an operation of comparing the phases between a reproduction signal and a read clock during a period when the second state signal is inputted. By performing the above operation, it is possible to prevent unlocking of phase locking resulting from an influence of recording noise on a read clock, and it is possible to obtain a synchronizing signal and address information relatively stably, using a reproduction signal to be obtained during a period when a light beam of a low power is irradiated, even during a recording operation.

Alternatively, the digital signal processor 202 may delay a start timing or an end timing of the second state signal, and may determine a period when the aforementioned stop operation is performed, using a recording signal that is issued after the delay of the second state signal. The delay amount of the timing may be adjusted, taking into account a circuit delay resulting from signal processing, or the elements which may be affected by recording noise.

As another modification example, the analog signal processor 201 may be internally provided with an amplitude gain switching circuit, so that a reproduction signal during a period when a light beam of a high power is irradiated may also be utilized.

Figure 7:
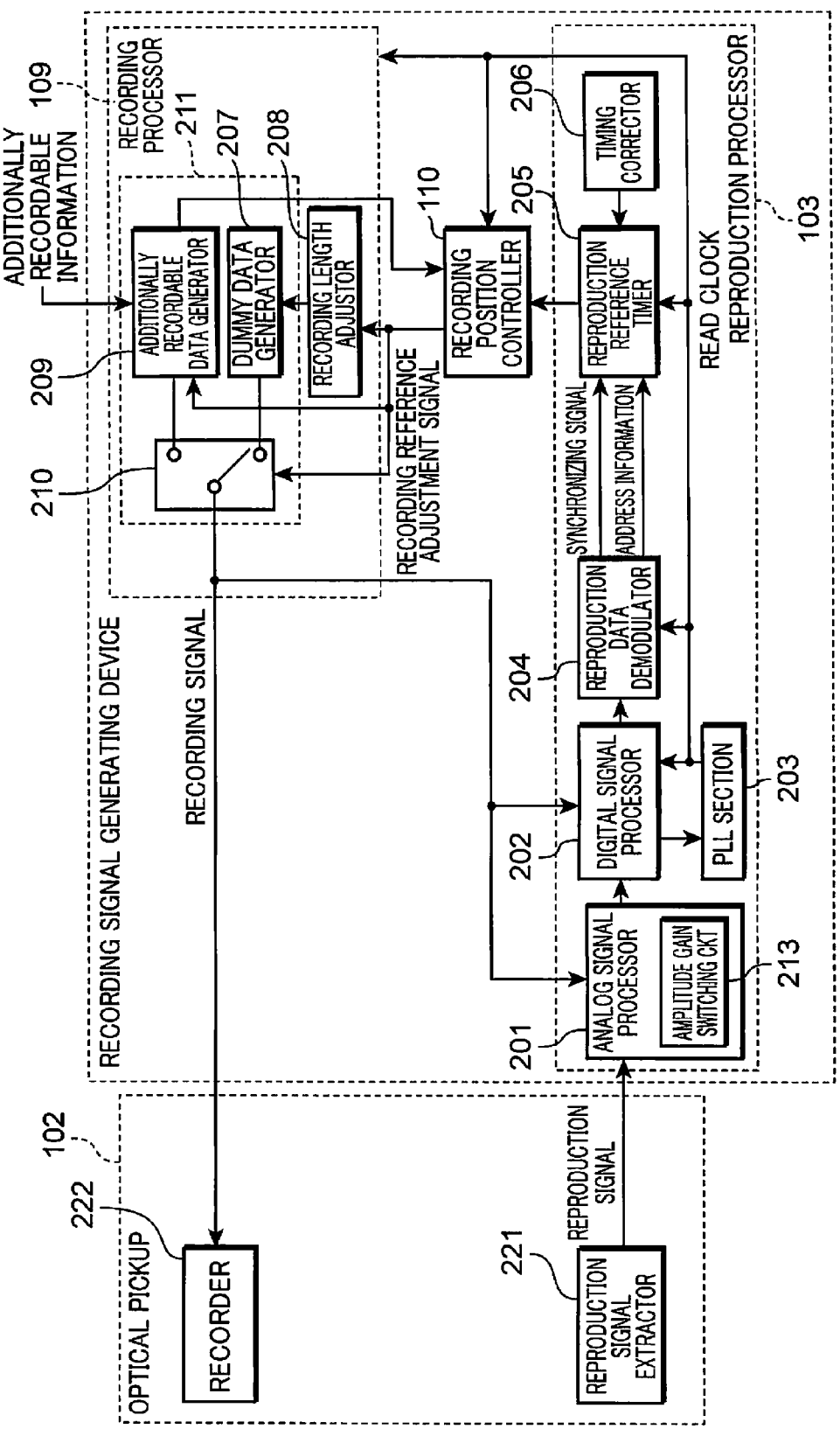
FIG. 7 is a diagram showing a configuration example of the recording signal generating device in a modification of the first embodiment.

FIG. 7 is a diagram showing a configuration example of the recording signal generating device as a modification of the first embodiment. Referring to FIG. 7, the elements having the same arrangements as those of the recording signal generating device shown in FIG. 5 are indicated with the same reference signs, and description thereof is omitted herein. The recording signal generating device shown in FIG. 7 is different from the recording signal generating device shown in FIG. 5 in a point that an analog signal processor 201 in FIG. 7 includes an amplitude gain switching circuit 213.

The amplitude gain switching circuit 213 switches the amplitude gain of a reproduction signal in such a manner that the amplitude of the reproduction signal is lowered at least during a period when a light beam of the second light intensity is irradiated. The PLL section 203 reproduces a channel clock, using the reproduction signal to be controlled by the amplitude gain switching circuit 213. The digital signal processor 202 specifies a reproducing position, using the reproduction signal to be controlled by the amplitude gain switching circuit 213. The amplitude gain switching circuit 213 corresponds to an example of a gain switcher.

The amplitude gain switching circuit 213 individually sets the gains for a reproduction signal during a period when a light beam of a high power is irradiated, and during a period when a light beam of a low power is irradiated. For instance, in the case where the irradiation power during a high power period (a period when the second state signal is inputted), and the irradiation power during a low power period (a period when the first state signal is inputted) are respectively fixed, and the power ratio between the irradiation powers is set to 5:1, the amplitude gain switching circuit 213 is operable to set the amplitude of the reproduction signal after gain switching to a fixed value by setting the gain ratio for the reproduction signal to 1:5, which is opposite to the power ratio. By performing the above operation, it is possible to suppress an influence by a change in the light intensity of a light beam to be irradiated, and the possibility of obtaining edge information of a concave-convex mark based on a reproduction signal during a period when a light beam of a high power is irradiated is increased, thereby increasing the possibility of stabilizing the PLL control.

As yet another modification example, the period when a light beam of a high power is irradiated, or a cycle at which a light beam of a high power is irradiated may be determined in such a manner that a frequency region of a recording signal and a frequency region of a reproduction signal to be obtained from a concave-convex mark can be isolated from each other. The period when a light beam of a high power is irradiated corresponds to the length of an additionally recordable mark including second information, and the cycle at which a light beam of a high power is irradiated corresponds to an interval between a recording start position (or a recording end position) of an additionally recordable mark and a recording start position (or a recording end position) of a succeeding additionally recordable mark.

For instance, the period when a light beam of a high power is irradiated is determined in such a manner that the period is sufficiently longer than the period of the maximum mark length of a concave-convex mark. By performing the above operation, the frequency region of recording noise which may be generated resulting from a change in the irradiation power can be lowered, thereby isolating the recording noise which may intrude into a reproduction signal during a recording operation, using a high-frequency passing filter (a high-pass filter).

Further, it is preferable to set the output period of the second state signal longer than the period of the maximum length of the concave-convex mark. Further alternatively, the output period of the second state signal may be set to a period longer than ten times the period of the average length of the concave-convex mark. Further alternatively, the period when a light beam of a high power is irradiated may be determined in such a manner that the period is equal to or longer than ten times the period of the average mark length of the concave-convex mark. With the above modification, it is possible to attenuate recording noise which may intrude into a reproduction signal during a recording operation, using a first-order high-pass filter.

Further alternatively, the cycle at which a light beam of a high power is irradiated may be determined in such a manner that the cycle is equal to or longer than one-hundred times the period of the average mark length of the concave-convex mark.

With the above modification, a large cycle at which a light beam of a high power is irradiated can be secured. Accordingly, the chance of obtaining edge information of a concave-convex mark utilizing a period when a light beam of a low power is irradiated is increased, which enables to increase the possibility of stably reproducing a frame sync or address data even during a recording operation.

It should be noted, however, that even if the aforementioned reproduction signal hold control or gain switching control has been performed in a recording operation of second information, if the length or the frequency of the output period of a second state signal (a period when a light beam of a high power is irradiated) is increased, a period when edge information of the concave-convex mark is obtained, which is necessary for PLL, is decreased, which may make the phase locked state unstable.

In view of the above drawback, the optical disc recording device is configured such that a recording position displacement amount during a recording operation is detected, and a recording signal is corrected based on the detected recording position displacement amount, which is the primary feature of the invention.

In the following, there are described operation examples of the recording signal generating device, in a normal case where recording position displacement has not occurred, in a case where recording position displacement has occurred in forward direction (in a timewise advanced direction), and in a case where recording position displacement has occurred in rearward direction (in a timewise delayed direction), referring to FIGS. 8 through 11.

Figure 8:
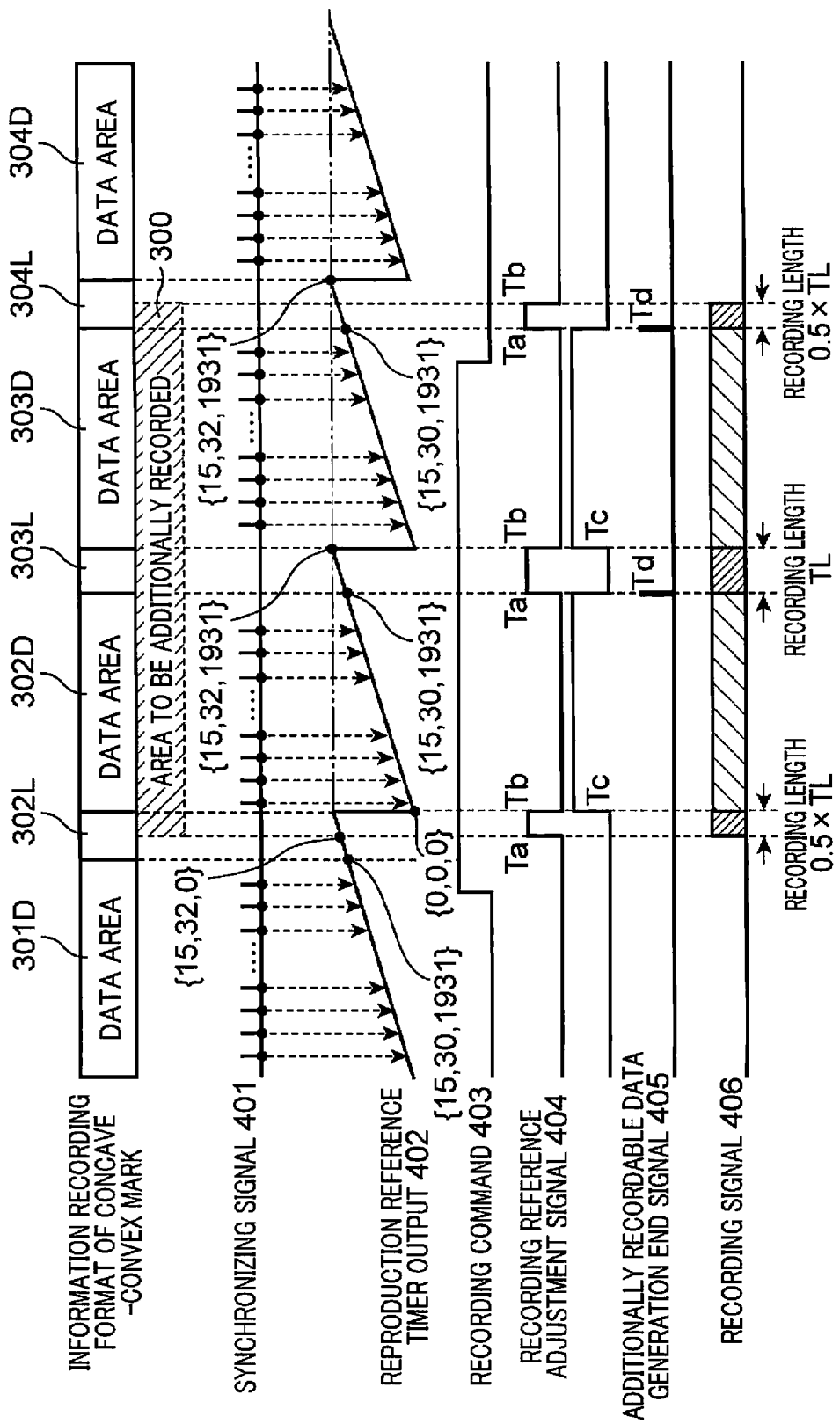
FIG. 8 is a timing chart in a normal case where recording position displacement has not occurred in a recording operation of sequentially recording second information in two consecutive recording blocks.

FIG. 8 is a timing chart in a normal case, wherein recording position displacement has not occurred during a recording operation of recording second information sequentially in two consecutive recording blocks.

A synchronizing signal 401 is a pulse signal which is outputted at a timing corresponding to the leading end of each frame by the reproduction data demodulator 204. Address information is information obtained by decoding address data included in each address unit in a reproduction signal by the reproduction data demodulator 204.

A reproduction reference timer output 402 is incremented, based on a synchronizing signal, and information on a lower bit portion which is necessary for identifying at least as to which address unit number the each address unit belongs to in the data area, out of the address information, assuming that an area constituted of one data area and one linking area corresponds to one cycle.

Figure 9:
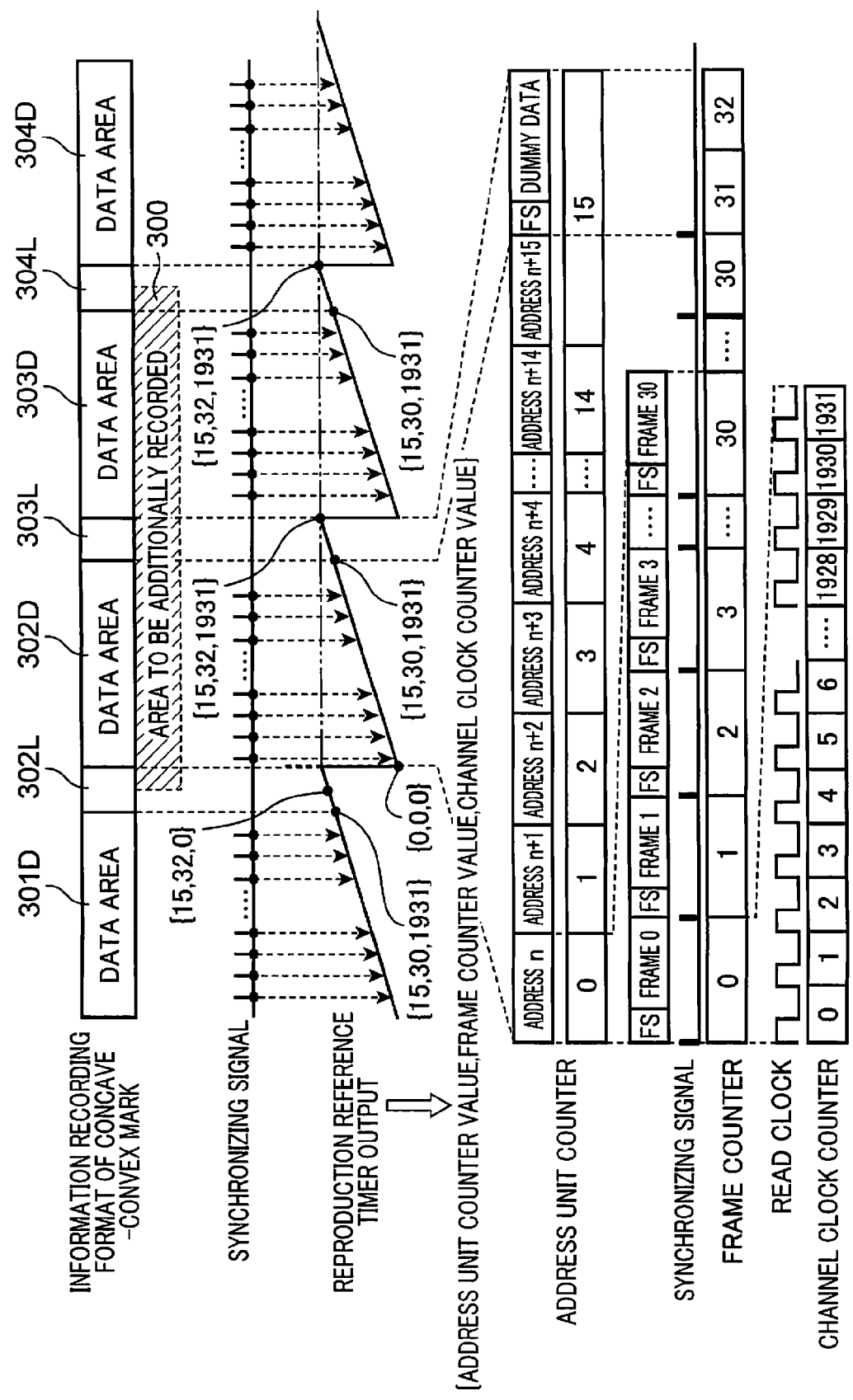
FIG. 9 is a timing chart for describing correspondence between a reproduction reference timer output and an information recording format of a concave-convex mark.

FIG. 9 is a timing chart for describing correspondence between a reproduction reference timer output and an information recording format of a concave-convex mark.

More specifically, the reproduction reference timer output is constituted of an address unit counter value, a frame counter value and a channel clock counter value in accordance with the information recording format of the concave-convex mark described referring to FIG. 3. In this embodiment, the address unit counter value, the frame counter value and the channel clock counter value, as a reproduction reference timer output, are described as {address unit counter value, frame counter value, channel clock counter value}.

For instance, the value of a counter group at a timing corresponding to the leading end of each data area is expressed as {0, 0, 0}. The channel clock counter performs an operation of incrementing the counter from 0 to 1,931 at a cycle of one frame period, and then, returning the counter value to zero. The frame counter performs an operation of incrementing the counter at the same clock cycle as returning the channel clock counter to zero, incrementing the counter from 0 to 30 at a cycle of period corresponding to one address unit, and then returning the counter value to zero. The address unit counter performs an operation of incrementing the counter at the same clock cycle as returning the frame counter to zero, and incrementing the counter from 0 to 15 at a cycle of period corresponding to one data area. In a linking area (corresponding to a two-frame cycle), the address unit counter value is retained to "15", the channel clock counter value is incremented for a period of two cycles, and the frame counter value is counted up to "31" and "32".

Further, synchronization of the counter group may be realized by presetting each counter value to a predetermined value at a pulse timing of a synchronizing signal, or at a timing at which the address information can be decoded, using a read clock, a synchronizing signal, a frame number derived from an address unit recognized based on a frame sync ID, and an address unit number derived from a data area recognized based on address information.

By performing the above operation, each counter value is set to {0, 0, 0} at the leading end of the data area, is set to {15, 30, 1,931} at the trailing end of the data area, is set to {15, 31, 0} at the leading end of the linking area, and is set to {15, 32, 1,931} at the trailing end of the linking area in a state that the read clock generated by the PLL section 203 is phase-locked at a concave-convex mark.

Referring back to FIG. 8, the recording position controller 110 outputs, as a recording reference adjustment signal 404, a control signal including a timing (the timing Ta shown in FIG. 8) at which output of dummy data is started, a timing (the timing Tb shown in FIG. 8) at which output of dummy data is stopped, and a timing (the timing Tc shown in FIG. 8) at which generation of additionally recordable data is started.

Firstly, upon receiving a recording command 403 from the system controller 112, the recording position controller 110 starts a recording operation. The recording command 403 is such that HIGH level indicates a recording operation is started, and LOW level indicates that a recording operation is stopped. In the case where the counter output of the reproduction reference timer 205 has reached a predetermined value e.g. {15, 30, 1,931} indicating the trailing end of a data area, the recording position controller 110 outputs a recording reference adjustment signal 404, referring to the recording command 403, and controls such that a recording operation is started when the recording command 403 is set to HIGH level, and a recording operation is stopped when the recording command 403 is set to LOW level.

(Recording Starting Operation)

In this section, a recording starting operation is described. The recording position controller 110 outputs a recording reference adjustment signal 404 of HIGH level at the dummy data output start timing Ta, in the case where the counter output of the reproduction reference timer 205 is set to {15, 32, 0}, and then, a recording operation is started. In performing the above operation, the dummy data generator 207 starts outputting the generated dummy data, and the recording data selector 210 changes over the switch to the dummy data output side, based on a value of the recording reference adjustment signal 404.

Then, upon lapse of a read clock number corresponding to a predetermined recording length (0.5×TL), the recording position controller 110 outputs a recording reference adjustment signal 404 of LOW level at the dummy data output stop timing Tb, and the dummy data generator 207 temporarily stops the output of dummy data. When the above operation is performed, the recording data selector 210 changes over the switch to the additionally recordable data output side. At a first stage of starting a recording operation, the period from the dummy data output start timing Ta to the dummy data output stop timing Tb is set to the predetermined recording length (0.5×TL), in other words, is set to the one-frame length corresponding to one half the length of a linking area. It is normal to output a signal for stopping output of dummy data at the trailing end of a linking area (i.e., at the leading end of a succeeding data area).

Further, the additionally recordable data output start timing Tc and the dummy data output stop timing Tb may coincide with each other, because the additionally recordable data output start timing Tc at which generation of additionally recordable data is started corresponds to the dummy data output stop timing Tb at which output of dummy data is stopped, during a recording operation.

An additionally recordable data generation end signal 405 is a timing signal of notifying the recording position controller 110 of an end of additionally recordable data generation by the additionally recordable data generator 209. The additionally recordable data generator 209 starts generating additionally recordable data at the additionally recordable data output start timing Tc, and outputs an additionally recordable data generation end signal 405 at the additionally recordable data output end timing Td indicating that output of additionally recordable data of a predetermined recording length has been ended. The additionally recordable data generator 209 generates and outputs additionally recordable data of a bit number corresponding to the length of a data area, using a read clock. Thus, normally, a period from the additionally recordable data output start timing Tc to the additionally recordable data output end timing Td coincides with a period corresponding to a data area. Further, normally, an additionally recordable data generation end signal 405 of HIGH pulse is outputted at the timing Td corresponding to the trailing end of a data area.

Upon receiving the additionally recordable data generation end signal 405, the recording position controller 110 refers to the value of the counter group i.e. the output of the reproduction reference timer 205 at the HIGH pulse output timing Td. The HIGH pulse output timing Td of the additionally recordable data generation end signal 405 corresponds to a timing indicating that additionally recordable data of a predetermined recording length has been ended, and normally, corresponds to the trailing end of a data area. Accordingly, the value of the referred counter group is normally set to {15, 30, 1,931}. In other words, a state that the value of the referred counter group is set to {15, 30, 1,931} is a state free of recording position displacement.

(Recording Continuing Operation)

In this section, a recording continuing operation is described. During a recording operation of sequentially recording in two or more consecutive recording blocks, it is necessary to start outputting dummy data of a predetermined recording length, following an end of generation of additionally recordable data. In response to detecting that the recording command 403 is still in HIGH level at the output timing Td of an additionally recordable data generation end signal 405, the recording position controller 110 issues a control signal for outputting dummy data again. In other words, in the case where the above condition is established, the recording position controller 110 outputs a recording reference adjustment signal 404 of HIGH level at the dummy data output start timing Ta. When the above operation is performed, the dummy data generator 207 resumes output of the generated dummy data, and the recording data selector 210 changes over the switch to the dummy data output side.

Then, the output period of dummy data during a recording operation of sequentially recording in two or more consecutive recording blocks is normally set to the recording length TL which is equal to the recording length of a linking area, and the length is changed in accordance with a recording position displacement amount. In other words, the recording position controller 110 outputs a recording reference adjustment signal 404 of HIGH level at the dummy data output start timing Ta, and then, outputs a recording reference adjustment signal 404 of LOW level at the dummy data output stop timing Tb upon lapse of a clock number corresponding to a value (TL−ΔT) obtained by increasing or decreasing the recording position displacement amount ΔT with respect to the predetermined recording length TL. Upon receiving the recording reference adjustment signal 404 of LOW level, the dummy data generator 207 stops outputting dummy data, and the recording data selector 210 changes over the switch to the additionally recordable data output side.

FIG. 8 shows a case where the recording position displacement amount ΔT is detected to be ΔT=0. The recording position controller 110 outputs a recording reference adjustment signal 404 of LOW level at the dummy data output stop timing Tb upon lapse of a clock number corresponding to the predetermined normal recording length TL.

Further, the recording position controller 110 outputs a recording reference adjustment signal 404 for recording additionally recordable data at the additionally recordable data output start timing Tc which coincides with the dummy data output stop timing Tb, and the additionally recordable data generator 209 starts outputting additionally recordable data in the second recording block.

By performing the above operation, the dummy data output start timing and the dummy data output stop timing coincide with a start position and an end position of a linking area on the base track. In other words, it is possible to realize a state free of recording position displacement.

(Recording Stopping Operation)

In this section, a recording stopping operation is described. After generation of additionally recordable data by the additionally recordable data generator 209 is ended, and in response to output of an additionally recordable data generation end signal 405, the recording position controller 110 checks the recording position displacement again, and judges whether the recording operation is to be continued or to be stopped.

Specifically, the recording position controller 110 detects a recording position displacement amount, referring to the value of the counter group i.e. an output of the reproduction reference timer 205 at the output timing Td of the additionally recordable data generation end signal 405, detects the level of the recording command 403, and outputs a recording reference adjustment signal 404 of HIGH level at the dummy data output start timing Ta, in the case where the recording command 403 is in LOW level. Then, the routine proceeds to a recording stopping operation.

The output period of dummy data at the time of a recording stopping operation is normally set to the recording length (0.5×TL), and the recording position controller 110 increases or decreases the output period of dummy data in accordance with the detected recording position displacement amount ΔT. In other words, the recording position controller 110 outputs a recording reference adjustment signal 404 of HIGH level at the dummy data output start timing Ta, and then, outputs a recording reference adjustment signal 404 of LOW level at the dummy data output stop timing Tb upon lapse of a clock number corresponding to a value (0.5×TL−ΔT), which is obtained by increasing or decreasing the recording position displacement amount ΔT with respect to the predetermined recording length (0.5×TL).

As described above, the length of dummy data can be adjusted at the time of a recording starting operation, in a recording continuing operation and at the time of a recording stopping operation in accordance with a recording position displacement amount detected based on an output value of the reproduction reference timer 205. Accordingly, it is possible to additionally record second information into the base track and thereafter in a state free of recording position displacement.

Figure 10:
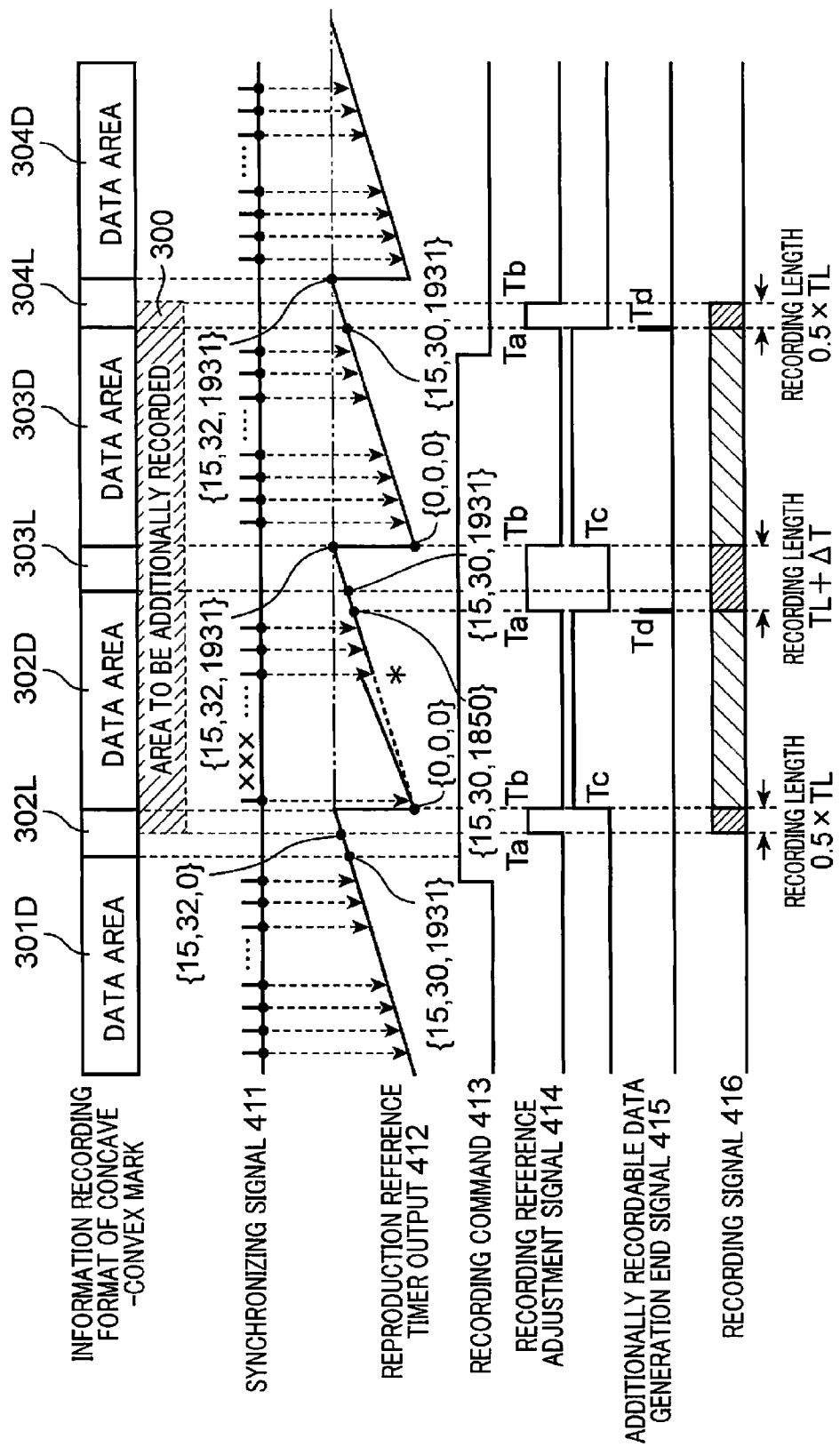
FIG. 10 is a timing chart in a case where the phase locking of PLL is unlocked during a recording operation of recording second information in a first one of two consecutive recording blocks, and the recording position is displaced in forward direction in performing the recording operation of sequentially recording the second information in the two consecutive recording blocks.

FIG. 10 is a timing chart, in the case where phase locking of PLL is unlocked during a recording operation of recording second information in a first one of two consecutive recording blocks, and the recording position is displaced in forward direction in performing the recording operation of sequentially recording the second information in the two consecutive recording blocks.

A synchronizing signal 411 and address information in FIG. 10 are the same as those in FIG. 8, and description thereof is omitted herein. In FIG. 10, however, phase locking of PLL is unlocked by external disturbance or an influence of recording noise intruded into a reproduction signal during a recording operation, and the signal is varied in a direction of raising the clock frequency, with the result that the interval of the synchronizing signal 411 is temporarily discontinued. A portion where the interval of the synchronizing signal 411 is discontinued is indicated by the mark x in FIG. 10.

A reproduction reference timer output 412 in FIG. 10 is basically the same as that in FIG. 8, and description thereof is omitted herein. In FIG. 10, however, the increment cycle is temporarily advanced in a period when the signal is varied in a direction of raising the clock frequency. In FIG. 10, the dotted line indicates a normal operation waveform, in which phase locking of PLL is locked, and the solid line indicates an operation waveform, in which phase locking of PLL is unlocked. The count value of the reproduction reference timer 205 is corrected to be decreased when PLL is recovered, the interval fluctuation of the synchronizing signal 411 is eliminated, and the synchronizing signal 411 is obtained at a correct cycle. The portion to be corrected is indicated by the mark * in FIG. 10. The count value corresponding to a step difference before and after correction is set to an error amount $\Delta T$.

The error amount $\Delta T$ coincides with a value obtained by integrating a cycle difference between a normal channel clock cycle obtained based on a linear velocity of an optical disc, and a read clock cycle i.e. an output of the PLL section 203, which is generated resulting from temporarily unlocking of phase locking of PLL. Further, in the recording processor 109, a recording signal is generated, using a read clock. Accordingly, the error amount $\Delta T$ directly serves as a recording position displacement amount.

In the following, an operation as to how the generated recording position displacement is corrected is described.

In response to an end of generation of additionally recordable data in the first recording block, the additionally recordable data generator 209 outputs an additionally recordable data generation end signal 415 to the recording position controller 110.

Upon receiving the additionally recordable data generation end signal 415, the recording position controller 110 refers to the value of the counter group included in the output 412 of the reproduction reference timer 205 at the HIGH pulse output timing Tb. The recording position controller 110 compares between the referred value of the counter group, and the normal value {15, 30, 1,931} of the counter group at the trailing end of a data area; and calculates a recording position displacement amount. For instance, in the case where the referred value is {15, 30, 1,850}, the difference $\Delta T$ between the referred value and the normal value is 1,850−1,931=−81. Thus, it is clear that recording position displacement corresponding to 81 channel clocks has occurred in forward direction.

The detected recording position displacement amount is used for adjustment of the output length of succeeding dummy data. In other words, the recording position controller 110 outputs a recording reference adjustment signal 414 of HIGH level for starting output of dummy data at the dummy data output start timing Ta, and then, outputs a recording reference adjustment signal 414 of LOW level for stopping output of dummy data at the dummy data output stop timing Tb upon lapse of a clock number corresponding to a value (TL+$\Delta T$), which is obtained by adding the recording position displacement amount $\Delta T$ to the predetermined recording length TL. For instance, assuming that the recording length TL=1,932×2=3,864, and the recording position displacement amount $\Delta T$=−81, dummy data of 3,864 channel bits length is outputted, in the case where there is no recording position displacement. In this example, the dummy data output stop timing Tb is adjusted in such a manner that dummy data of TL−$\Delta T$=3,945 channel bits length is outputted. Consequently, the recording position controller 110 performs a control operation of extending the output length of dummy data by the length corresponding to 81 channel bits.

As described above, extending a recording period of dummy data provides substantially the same effect as correcting a recording position displacement amount, and recording position displacement of additionally recordable data that has occurred in a data area can be absorbed in a period corresponding to a linking area succeeding the additionally recordable data where the recording position displacement has occurred. Thus, it is possible to correct the recording position so that there remains no displacement at a recording start position of a data area succeeding the linking area and thereafter.

An operation to be performed following the operation of outputting additionally recordable data in the second recording block is substantially the same as the operation in a normal state described referring to FIG. 8, and description thereof is omitted herein.

As described above, it is possible to adjust the output length of dummy data at the time of a recording starting operation, in a recording continuing operation and at the time of a recording stopping operation in accordance with a recording position displacement amount detected based on an output value of the reproduction reference timer 205. Accordingly, even if recording position displacement has occurred such that a recording position is displaced in forward direction during a recording operation into a data area, the output length of dummy data is adjusted in such a direction that the output of dummy data is extended by the detected recording position displacement amount, utilizing a succeeding linking area. Thus, it is possible to correct and set the data area succeeding the linking area and thereafter to a state free of recording position displacement of additionally recordable data to be recorded on the base track, without interruption of a recording operation.

Figure 11:
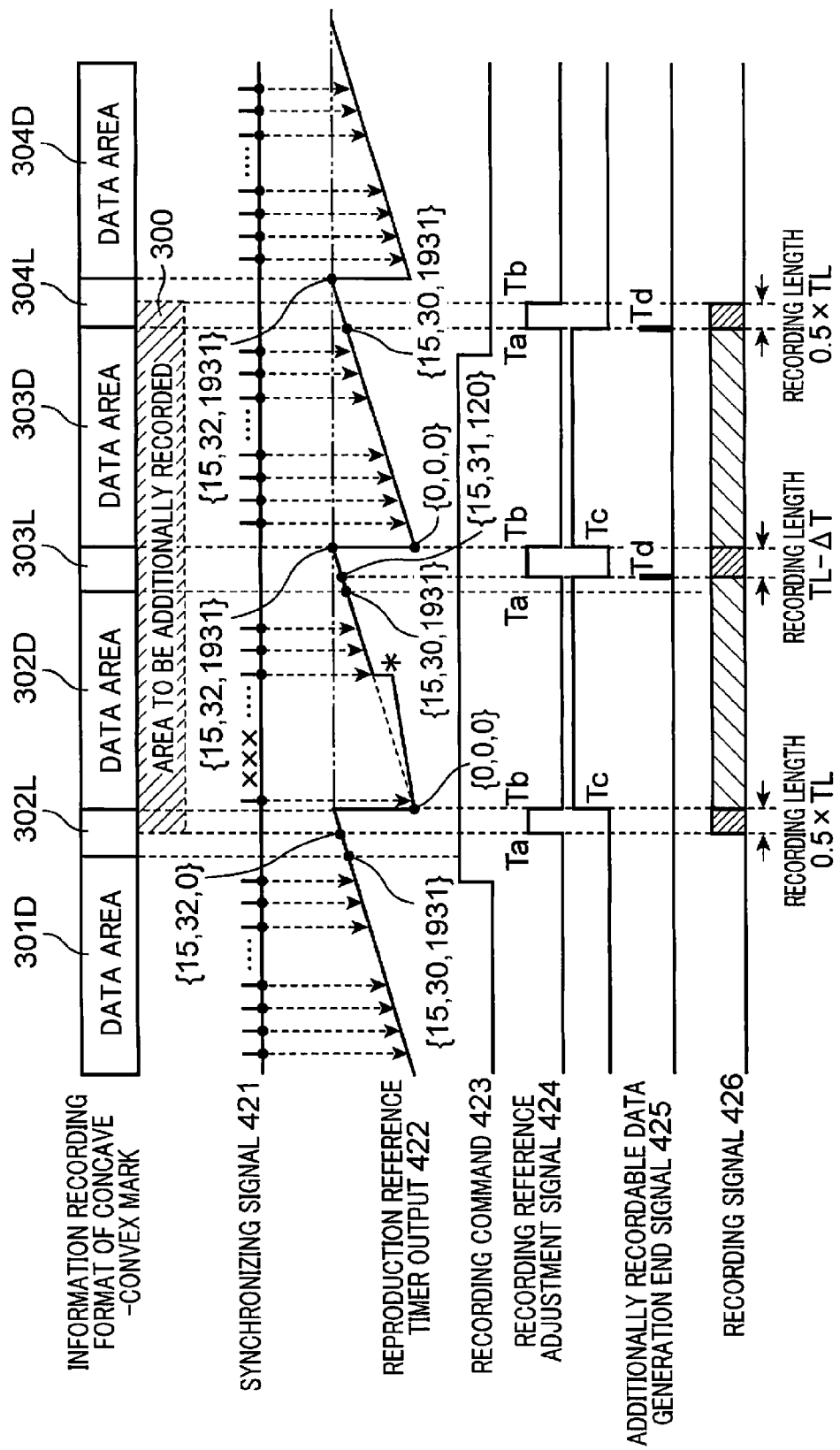
FIG. 11 is a timing chart in a case where the phase locking of PLL is unlocked during a recording operation of recording the second information in a first one of two consecutive recording blocks, and the recording position is displaced in rearward direction in performing the recording operation of sequentially recording the second information in the two consecutive recording blocks.

FIG. 11 is a timing chart, in the case where phase locking of PLL is unlocked during a recording operation of recording second information in a first one of two consecutive recording blocks, and the recording position is displaced in rearward direction in performing the recording operation of sequentially recording the second information in the two consecutive recording blocks.

A synchronizing signal 421 and address information in FIG. 11 are the same as those in FIG. 8, and description thereof is omitted herein. In FIG. 11, however, phase locking of PLL is unlocked by external disturbance or an influence of recording noise intruded into a reproduction signal during a recording operation, and the signal is varied in a direction of lowering the clock frequency, with the result that the interval of the synchronizing signal 421 is temporarily discontinued. A portion where the interval of the synchronizing signal 421 is discontinued is indicated by the mark x in FIG. 11.

A reproduction reference timer output 422 in FIG. 11 is basically the same as that in FIG. 8, and description thereof is omitted herein. In FIG. 11, however, the increment cycle is temporarily delayed in a period when the signal is varied in a direction of lowering the clock frequency. In FIG. 11, the dotted line indicates a normal operation waveform, in which phase locking of PLL is locked, and the solid line indicates an operation waveform, in which phase locking of PLL is unlocked. The count value of the reproduction reference timer 205 is corrected to be decreased when PLL is recovered, the interval fluctuation of the synchronizing signal 421 is eliminated, and the synchronizing signal 421 is obtained at a correct cycle. The portion to be corrected is indicated by the mark * in FIG. 11. The count value corresponding to a step difference before and after correction is set to an error amount $\Delta T$.

The error amount $\Delta T$ coincides with a value obtained by integrating a cycle difference between a normal channel clock cycle obtained based on a linear velocity of an optical disc, and a read clock cycle i.e. an output of the PLL section 203, which is generated resulting from temporarily unlocking of phase locking of PLL. Further, in the recording processor 109, a recording signal is generated, using a read clock. Accordingly, the error amount $\Delta T$ directly serves as a recording position displacement amount.

In the following, an operation as to how the generated recording position displacement is corrected is described.

In response to an end of generation of additionally recordable data in the first recording block, the additionally recordable data generator 209 outputs an additionally recordable data generation end signal 425 to the recording position controller 110.

Upon receiving the additionally recordable data generation end signal 425, the recording position controller 110 refers to the value of the counter group included in the output 422 of the reproduction reference timer 205 at the HIGH pulse output timing Tb. The recording position controller 110 compares between the referred value of the counter group, and the normal value {15, 30, 1,931} of the counter group at the trailing end of a data area; and calculates a recording position displacement amount. For instance, in the case where the referred value is {15, 31, 120}, the difference $\Delta T$ between the referred value and the normal value is $(31-30) \times 1,932 + 120 - 1,931 = 121$. Thus, it is clear that recording position displacement corresponding to 121 channel clocks has occurred in rearward direction.

The detected recording position displacement amount is used for adjustment of the output length of succeeding dummy data. In other words, the recording position controller 110 outputs a recording reference adjustment signal 424 of HIGH level for starting output of dummy data at the dummy data output start timing Ta, and then, outputs a recording reference adjustment signal 424 of LOW level for stopping output of dummy data at the dummy data output stop timing Tb upon lapse of a clock number corresponding to a value $(TL-\Delta T)$, which is obtained by subtracting the recording position displacement amount $\Delta T$ from the predetermined recording length TL. For instance, assuming that the recording length $TL=1,932 \times 2=3,864$, and the recording position displacement amount $\Delta T=121$, dummy data of 3,864 channel bits length is outputted, in the case where there is no recording position displacement. In this example, the dummy data output stop timing Tb is adjusted in such a manner that dummy data of $TL-\Delta T=3,743$ channel bits length is outputted. Consequently, the recording position controller 110 performs a control operation of shortening the output length of dummy data by the length corresponding to 121 channel bits.

As described above, shortening a recording period of dummy data provides substantially the same effect as correcting a recording position displacement amount, and recording position displacement of additionally recordable data that has occurred in a data area can be absorbed in a period corresponding to a linking area succeeding the additionally recordable data where the recording position displacement has occurred. Thus, it is possible to correct the recording position in such a manner that there remains no displacement at a recording start position of a data area succeeding the linking area and thereafter.

An operation to be performed following the operation of outputting additionally recordable data in the second recording block is substantially the same as the operation in a normal state described referring to FIG. 8, and description thereof is omitted herein.

As described above, it is possible to adjust the output length of dummy data at the time of a recording starting operation, in a recording continuing operation and at the time of a recording stopping operation in accordance with a recording position displacement amount detected based on an output value of the reproduction reference timer 205. Accordingly, even if a recording position is displaced in rearward direction during a recording operation into a data area, the output length of dummy data is adjusted in such a direction that the output of dummy data is shortened by the detected recording position displacement amount, utilizing a succeeding linking area. Thus, it is possible to correct and set a data area succeeding the linking area and thereafter to a state free of recording position displacement of additionally recordable data to be recorded on the base track, without interruption of a recording operation.

The recording reference adjustment signals described referring to FIG. 8, FIG. 10, FIG. 11 are a timing signal corresponding to a changing point of a state signal. The recording reference adjustment signal is not limited to the above. For instance, an individual pulse signal may be outputted at each timing, and the pulse signal to be outputted may be used as a timing signal. Further, the aforementioned modification may also be applied to the additionally recordable data generation end signal. In this embodiment, an example of the additionally recordable data generation end signal is a pulse signal. Alternatively, the additionally recordable data generation end signal may be a timing signal corresponding to a changing point of a state signal.

Second Embodiment

A preferred embodiment is described as the second embodiment of the invention.

Specifically, an optical disc recording device is configured such that a light beam is irradiated onto an optical disc recorded with first information in the form of an optically readable concave-convex mark, while changing the light intensity, and second information is recorded in a state that the light beam is focused on the concave-convex mark. The optical disc recording device includes a recording signal generating device for generating a recording signal for controlling the modulation of the light intensity.

In particular, the second embodiment is directed to an approach, other than the approach described in the first embodiment, of solving a drawback that PLL may be unstable, resulting from an influence of recording noise which is superimposed on a reproduction signal from a concave-convex mark during a recording operation of second information.

Figure 12:
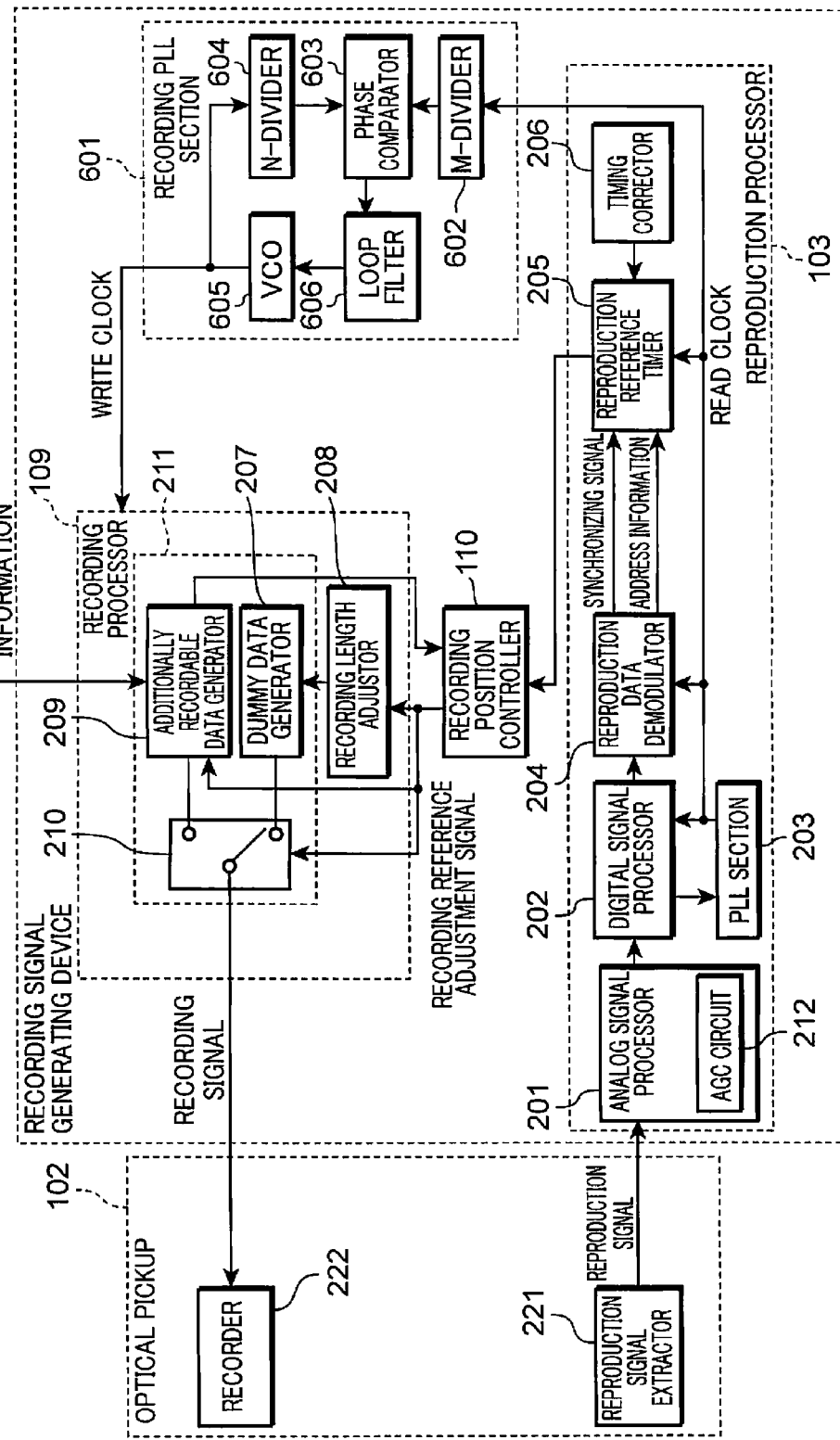
FIG. 12 is a block diagram showing a detailed configuration example of a recording signal generating device in the second embodiment of the invention.
Figure 13:
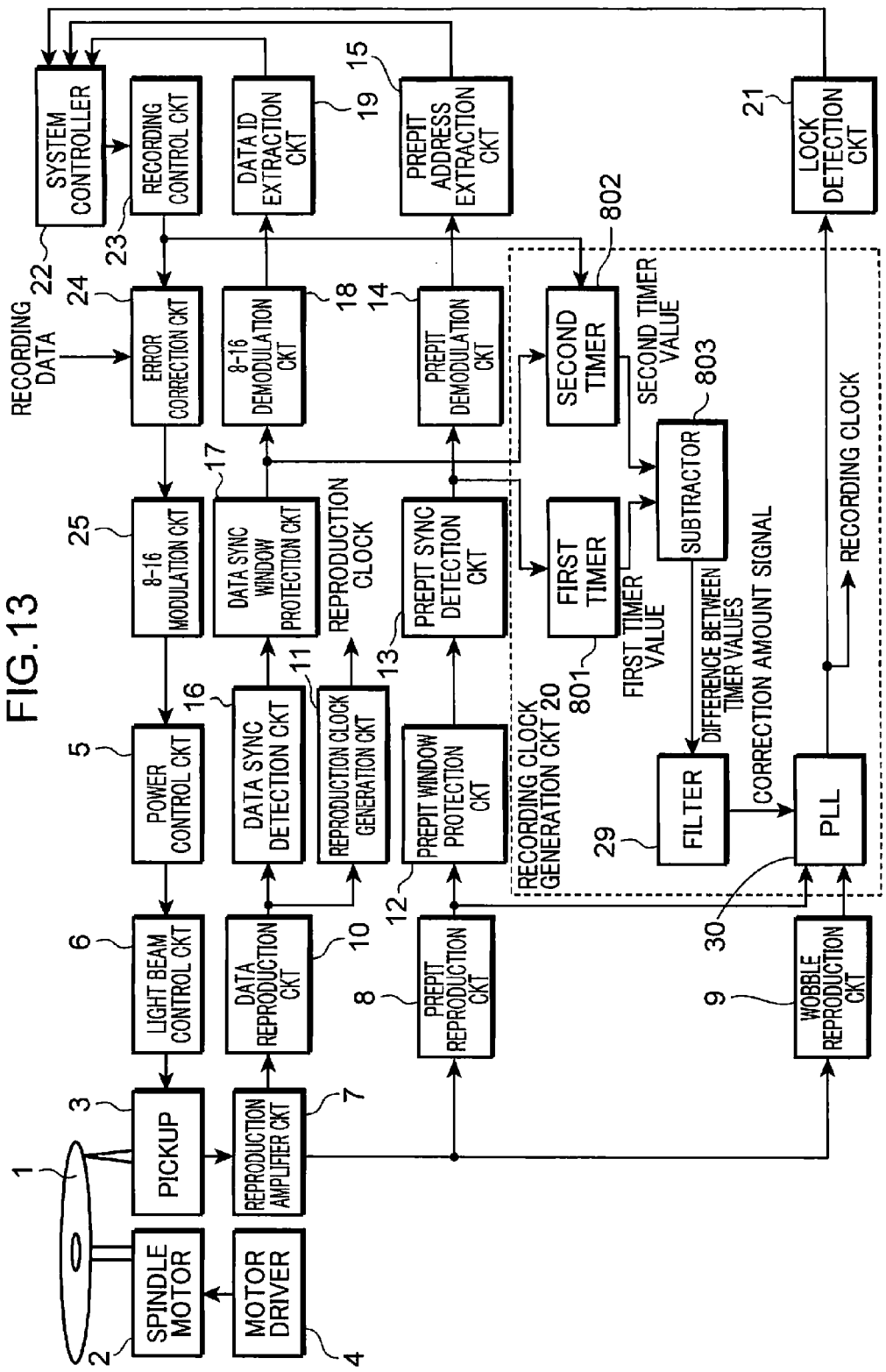
FIG. 13 is a diagram showing a configuration of a conventional optical disc device disclosed in patent literature 2.

In the following, the configuration of the recording signal generating device of the second embodiment is described referring to FIG. 12. FIG. 12 is a block diagram showing a detailed configuration example of the recording signal generating device of the second embodiment of the invention.

The recording signal generating device at least includes, as constituent elements, a reproduction processor 103, a recording position controller 110, a recording processor 109 and a recording PLL section 601.

The reproduction processor 103 includes an analog signal processor 201, a digital signal processor 202, a PLL section 203, a reproduction data demodulator 204, a reproduction reference timer 205 and a timing corrector 206.

The recording position controller 110 detects a recording position displacement amount, using an output from the reproduction reference timer 205, generates a recording reference adjustment signal in accordance with the detected recording position displacement amount, and outputs the generated recording reference adjustment signal to the recording processor 109.

The recording processor 109 is provided with a recording length adjustor 208 and a recording signal generator 211. The recording signal generator 211 includes a dummy data generator 207, an additionally recordable data generator 209 and a recording data selector 210.

Referring to FIG. 12, the constituent elements indicated with the same reference signs as those described referring to FIG. 5 are constituent elements basically having the same functions as those described referring to FIG. 5, and detailed description thereof is omitted herein. Further, the analog signal processor 201 shown in FIG. 12 includes an AGC circuit 212. However, the invention is not limited to the above, and the analog signal processor 201 may include the amplitude gain switching circuit 213 shown in FIG. 7.

The feature of the configuration example shown in FIG. 12 resides in a point that the recording PLL section 601 for generating a write clock to be used in recording processing is provided in addition to the PLL section 203 for generating a read clock to be used in a reproduction signal processing.

In response to input of a read clock, the recording PLL section 601 generates a write clock, whose frequency is synchronized with the frequency of the read clock by performing a frequency-dividing operation and a frequency-multiplying operation. A write clock is supplied to the recording processor 109, and is utilized for generating additionally recordable data including second information to be recorded, and for outputting a recording signal. The recording PLL section 601 includes an M-divider 602, a phase comparator 603, an N-divider 604, a VCO (Voltage Control Oscillator) 605 and a loop filter 606. The recording PLL section 601 corresponds to an example of a phase synchronizer.

The M-divider 602 outputs a read clock frequency-divided signal which is obtained by dividing a read clock by M (where M is a positive integer, and satisfies a relation: M>q, q is a parameter derived from the longest mark length qT (where T is a channel bit cycle) of a concave-convex mark). The N-divider 604 outputs a write clock frequency-multiplied signal which is obtained by multiplying a write clock by N (where N is a positive integer of 2 or more). The phase comparator 603 compares between the read clock frequency-divided signal and the write clock frequency-multiplied signal, and outputs a control signal for controlling the frequency of the VCO 605 in accordance with a phase comparison result. The loop filter 606 is a filter for stably operating the recording PLL section 601, while securing a necessary phase margin, by adjusting the gain of the recording PLL section 601 in response to receiving an output from the phase comparator 603. The VCO 605 is an oscillator for generating and outputting a write clock i.e. a clock signal of a variable frequency, based on a control signal in accordance with a phase comparison result outputted from the phase comparator 603 via the loop filter 606.

As described above, the recording PLL section 601 generates a frequency-divided clock which is obtained by dividing a channel clock reproduced by the PLL section 203 by M (where M is a positive integer, and satisfies a relation: M>q, q is a parameter derived from the longest mark length qT (where T is a channel bit cycle) of a concave-convex mark); and generates a frequency-multiplied clock, whose phase is synchronized with the phase of the generated frequency-divided clock, and which is obtained by multiplying the frequency-divided clock by N (where N is a positive integer of 2 or more). The recording signal generator 211 generates a recording signal, using a frequency-multiplied clock generated by the recording PLL section 601.

With the provision of the recording PLL section 601 having the above configuration, it is possible to obtain a write clock of N/M cycle, whose frequency is synchronized with the frequency of a read clock.

Use of a write clock obtained as above for generation of a recording signal is advantageous in enhancing frequency stability, as compared with a case where a read clock is directly used for generation of a recording signal. This is because the recording PLL section 601 is configured to perform a phase comparison operation, based on a signal obtained by frequency-dividing a read clock, and a clock signal can be obtained relatively stably, even if a read clock erroneously responds to a minor defect such as a scratch or a fingerprint on an optical disc, or even if the phase of a read clock becomes unstable in a condition that an edge component of a concave-convex mark cannot be continuously obtained from a reproduction signal during a recording operation.

The value "q" which is defined in relation to the frequency-dividing ratio M may be a parameter derived from the longest mark length qT (where T is a channel bit cycle) of a concave-convex mark on a base track. Setting the frequency-dividing ratio M for use in frequency-dividing a read clock to satisfy a relation: M>q enables to set the cycle of a frequency-divided clock longer than the cycle of the maximum mark length. With the above arrangement, the gain intersection of the recording PLL section 601 is lowered, and the phase is less likely to vary by an influence of a defect in relation to a concave-convex mark. Thus, it is possible to configure a phase locked loop capable of responding to a moderate frequency.

Further, the value "q" may be a parameter derived from the maximum mark length of an additionally recordable mark. With the above modification, the cycle of a read clock frequency-divided signal is set equal to a cycle longer than the cycle of the maximum mark length of an additionally recordable mark. Since the cycle of a read clock frequency-divided signal is set to a relatively long cycle, it is possible to reduce the frequency of performing phase comparison, based on an unstable read clock, even if it is impossible or difficult to obtain edge information of a concave-convex mark based on a reproduction signal, resulting from an influence of noise in a recording signal, and the phase of the read clock is temporarily unstable during a recording operation. Thus, it is possible to configure a phase locked loop capable of responding to a moderate frequency.

With the above-described configuration, it is possible to reduce a likelihood that recording position displacement may occur by generating a recording signal, using a write clock generated by the recording PLL section 601. Thus, it is possible to realize, in the optical disc recording device for recording second information, a recording signal generating device capable of enhancing stability and reliability on the recording position of the second information.

The first and second embodiments have been described by taking an example of an optical disc recording device configured to additionally record second information, on an optical disc pre-recorded with first information in the form of a concave-convex mark, in synchronism with the concave-convex mark. The invention is also applicable to an optical disc recording device capable of reading first information, based on an optical characteristic difference on a recording surface, in place of using a concave-convex shape of a recording surface.

The optical disc constructed such that first information is recorded by changing an optical characteristic is e.g. an optical disc, wherein a phase-change material, an organic dye material or a like material is used for a recording layer. In other words, the invention is also applicable to an optical disc recording device configured such that a recorded mark formed by causing a phase-change or a chemical change in a phase-change material component or in an organic dye material component on a recording layer is optically read, and second information is recorded in synchronism with the recorded mark.

Further, the invention is also applicable to an optical disc recording device of a so-called magneto-optic recording system, wherein a material having magnetism is used for a recording layer of an optical disc, and a magnetic head is additionally provided as a component of the optical disc recording device. In other words, the invention is also applicable to an optical disc recording device configured such that information is magnetically recorded and information is optically reproduced by utilizing both of a heat or a light intensity, and a magnetic field change.

The foregoing embodiments mainly include the invention having the following features.

An optical disc recording device according to an aspect of the invention is an optical disc recording device for recording, on an optical disc recorded with first information in the form of a concave-convex mark, second information different from the first information. A recording unit of the concave-convex mark includes a plurality of data areas in which the first information is recorded, and a plurality of linking areas, each of which is disposed between the adjacent ones of the data areas. The optical disc recording device includes a reproduction signal extractor which extracts a reproduction signal, based on reflected light from the concave-convex mark irradiated with a light beam; a clock reproducer which reproduces a channel clock synchronized with a channel bit length of the concave-convex mark, using the reproduction signal extracted by the reproduction signal extractor; a signal processor which specifies a reproducing position in the concave-convex mark, using the reproduction signal extracted by the reproduction signal extractor, and using the channel clock reproduced by the channel clock reproducer; a recording signal generator which generates a recording signal alternately including a plurality of additionally recordable data, each of which includes the second information and has a predetermined length, and a plurality of dummy data; a recorder which records the second information in synchronism with the concave-convex mark by modulating a light intensity of the light beam in accordance with the recording signal generated by the recording signal generator, and by irradiating the light beam of the modulated light intensity onto a reflection film formed on the concave-convex mark of the optical disc for changing an optical characteristic of the reflection film; a recording position displacement amount detector which detects a recording position displacement amount representing a displacement amount between the reproducing position and a recording position of the additionally recordable data, using the reproducing position specified by the signal processor, and using the recording signal generated by the recording signal generator; and a dummy data recording length controller which increases or decreases a recording length of the dummy data in accordance with the recording position displacement amount detected by the recording position displacement amount detector.

In the above arrangement, the recording unit of the concave-convex mark includes a plurality of data areas in which the first information is recorded, and a plurality of linking areas, each of which is disposed between the adjacent ones of the data areas. The reproduction signal extractor extracts a reproduction signal, based on reflected light from the concave-convex mark irradiated with a light beam. The clock reproducer reproduces a channel clock synchronized with a channel bit length of the concave-convex mark, using the reproduction signal extracted by the reproduction signal extractor. The signal processor specifies a reproducing position in the concave-convex mark, using the reproduction signal extracted by the reproduction signal extractor, and using the channel clock reproduced by the channel clock reproducer. The recording signal generator generates a recording signal alternately including a plurality of additionally recordable data, each of which includes the second information and has a predetermined length, and a plurality of dummy data. The recorder records the second information in synchronism with the concave-convex mark by modulating a light intensity of the light beam in accordance with the recording signal generated by the recording signal generator, and by irradiating the light beam of the modulated light intensity onto a reflection film formed on the concave-convex mark of the optical disc for changing an optical characteristic of the reflection film. The recording position displacement amount detector detects a recording position displacement amount representing a displacement amount between the reproducing position and a recording position of the additionally recordable data, using the reproducing position specified by the signal processor, and using the recording signal generated by the recording signal generator. The dummy data recording length controller increases or decreases a recording length of the dummy data in accordance with the recording position displacement amount detected by the recording position displacement amount detector.

Thus, it is possible to correct a displacement between a reproducing position of a reproduction signal from a concave-convex mark preformed in an optical disc, and a recording position of additionally recordable data to be recorded in synchronism with the reproduction signal, and to stably and speedily record second information.

Further, in the optical disc recording device, preferably, the recording position displacement amount detector may detect the recording position displacement amount by comparing between a recording end position of the additionally recordable data to be recorded in correspondence to the data area, and a leading position of the linking area immediately succeeding and adjacent to the data area, at a timing at which an output of the additionally recordable data of the predetermined length is ended, the additionally recordable data being included in the recording signal generated by the recording signal generator.

With the above arrangement, a recording position displacement amount is detected by comparing between a recording end position of the additionally recordable data to be recorded in correspondence to the data area, and a leading position of the linking area immediately succeeding and adjacent to the data area. Thus, it is possible to accurately record the additionally recordable data in correspondence to the data area immediately succeeding and adjacent to the linking area.

Further, in the optical disc recording device, preferably, the recording signal may alternately include a first state signal corresponding to a first light intensity, in which an optical characteristic of the reflection film is not changed, and a second state signal corresponding to a second light intensity, in which an optical characteristic of the reflection film is changed, and at least a part of the dummy data may be constituted of the first state signal.

With the above arrangement, the recording signal alternately includes a first state signal corresponding to a first light intensity, in which an optical characteristic of the reflection film is not changed, and a second state signal corresponding to a second light intensity, in which an optical characteristic of the reflection film is changed. At least a part of the dummy data is constituted of the first state signal.

With the above arrangement, at least a part of the dummy data is recorded by irradiating a light beam of the first light intensity, in which an optical characteristic of the reflection film is not changed. Thus, edge information of the concave-convex mark can be read from the portion where the light beam of the first light intensity is irradiated, and it is possible to recognize the reproducing position even during a recording operation.

Further, in the optical disc recording device, preferably, the recording signal may alternately include a first state signal corresponding to a first light intensity, in which an optical characteristic of the reflection film is not changed, and a second state signal corresponding to a second light intensity, in which an optical characteristic of the reflection film is changed, and an output period of the second state signal may be set to a period longer than a period corresponding to a maximum length of the concave-convex mark.

With the above arrangement, the recording signal alternately includes a first state signal corresponding to a first light intensity, in which an optical characteristic of the reflection film is not changed, and a second state signal corresponding to a second light intensity, in which an optical characteristic of the reflection film is changed. An output period of the second state signal is set to a period longer than a period corresponding to a maximum length of the concave-convex mark.

Since the output period of the second state signal is set to a period longer than a period corresponding to the maximum length of the concave-convex mark, it is possible to reduce recording noise which may be intruded into the reproduction signal during a recording operation.

Further, in the optical disc recording device, preferably, the recording signal may alternately include a first state signal corresponding to a first light intensity, in which an optical characteristic of the reflection film is not changed, and a second state signal corresponding to a second light intensity, in which an optical characteristic of the reflection film is changed, and the clock reproducer may temporarily stop a phase control operation of a channel clock by interrupting a phase synchronizing operation of the reproduction signal at least during a period when a light beam of the second light intensity is irradiated, using the second state signal.

With the above arrangement, the recording signal alternately includes a first state signal corresponding to a first light intensity, in which an optical characteristic of the reflection film is not changed, and a second state signal corresponding to a second light intensity, in which an optical characteristic of the reflection film is changed. The clock reproducer temporarily stops a phase control operation of a channel clock by interrupting a phase synchronizing operation of the reproduction signal at least during a period when a light beam of the second light intensity is irradiated, using the second state signal.

The above arrangement enables to prevent a likelihood that phase locking may be unlocked resulting from an influence of recording noise on a channel clock, and enables to reproduce the channel clock relatively stably, using the reproduction signal to be obtained during a period when the light beam of the first light intensity is irradiated, even during a recording operation.

Further, in the optical disc recording device, preferably, the recording signal may alternately include a first state signal corresponding to a first light intensity, in which an optical characteristic of the reflection film is not changed, and a second state signal corresponding to a second light intensity, in which an optical characteristic of the reflection film is changed, the signal processor may include an automatic gain controller which performs an automatic gain control operation to suppress amplitude variation of the reproduction signal, the automatic gain controller may stop the automatic gain control operation of the reproduction signal at least during a period when a light beam of the second light intensity is irradiated, the clock reproducer may reproduce the channel clock, using the reproduction signal to be controlled by the automatic gain controller, and the signal processor may specify the reproducing position, using the reproduction signal to be controlled by the automatic gain controller.

With the above arrangement, the recording signal alternately includes a first state signal corresponding to a first light intensity, in which an optical characteristic of the reflection film is not changed, and a second state signal corresponding to a second light intensity, in which an optical characteristic of the reflection film is changed. The signal processor includes an automatic gain controller which performs an automatic gain control operation to suppress amplitude variation of the reproduction signal. The automatic gain controller stops the automatic gain control operation of the reproduction signal at least during a period when a light beam of the second light intensity is irradiated. The clock reproducer reproduces the channel clock, using the reproduction signal to be controlled by the automatic gain controller. The signal processor specifies the reproducing position, using the reproduction signal to be controlled by the automatic gain controller.

Thus, the automatic gain control operation of the reproduction signal is stopped at least during the period when the light beam of the second light intensity is irradiated. Accordingly, it is possible to prevent deterioration of S/N ratio of the reproduction signal by erroneous gain adjustment for the reproduction signal, resulting from recording noise, even if the recording noise is temporarily intruded into the reproduction signal by an influence of irradiation of the light beam of the second light intensity.

Further, in the optical disc recording device, preferably, the recording signal may alternately include a first state signal corresponding to a first light intensity, in which an optical characteristic of the reflection film is not changed, and a second state signal corresponding to a second light intensity, in which an optical characteristic of the reflection film is changed, the signal processor may include a gain switcher which switches an amplitude gain of the reproduction signal in such a manner that an amplitude of the reproduction signal is lowered at least during a period when a light beam of the second light intensity is irradiated, the clock reproducer may reproduce the channel clock, using the reproduction signal to be controlled by the gain switcher, and the signal processor may specify the reproducing position, using the reproduction signal to be controlled by the gain switcher.

With the above arrangement, the recording signal alternately includes a first state signal corresponding to a first light intensity, in which an optical characteristic of the reflection film is not changed, and a second state signal corresponding to a second light intensity, in which an optical characteristic of the reflection film is changed. The signal processor includes a gain switcher which switches an amplitude gain of the reproduction signal in such a manner that an amplitude of the reproduction signal is lowered at least during a period when a light beam of the second light intensity is irradiated. The clock reproducer reproduces the channel clock, using the reproduction signal to be controlled by the gain switcher. The signal processor specifies the reproducing position, using the reproduction signal to be controlled by the gain switcher.

Thus, the amplitude gain of the reproduction signal is switched in such a manner that the amplitude of the reproduction signal is lowered at least during the period when the light beam of the second light intensity is irradiated. The above arrangement enables to set the amplitude of the reproduction signal after the gain switching operation to a constant value. The above arrangement also enables to obtain edge information of the concave-convex mark, based on the reproduction signal to be obtained during a period when the light beam of the second light intensity is irradiated, while suppressing an influence resulting from a change in the light intensity of the light beam to be irradiated.

Further, in the optical disc recording device, preferably, the data area may include at least one synchronization pattern data, and at least one position information data; and the signal processor may specify the reproducing position, using the synchronization pattern data and the position information data detected based on the reproduction signal.

With the above arrangement, it is possible to specify the reproducing position, using the synchronization pattern data and the position information data detected based on the reproduction signal.

Further, the optical disc recording device may preferably further include a phase synchronizer which generates a frequency-divided clock obtained by dividing the channel clock reproduced by the clock reproducer by M (where M is a positive integer, and satisfies a relation: M>q, q is a parameter derived from a longest mark length qT (where T is a channel bit cycle) of a concave-convex mark), and which generates a frequency-multiplied clock, whose phase is synchronized with a phase of the generated frequency-divided clock, and which is obtained by multiplying the frequency-divided clock by N (where N is a positive integer of 2 or more), wherein the recording signal generator generates the recording signal, using the frequency-multiplied clock generated by the phase synchronizer.

With the above arrangement, the phase synchronizer generates a frequency-divided clock obtained by dividing the channel clock reproduced by the clock reproducer by M, and generates a frequency-multiplied clock, whose phase is synchronized with a phase of the generated frequency-divided clock, and which is obtained by multiplying the frequency-divided clock by N. The recording signal generator generates the recording signal, using the frequency-multiplied clock generated by the phase synchronizer.

The above arrangement enables to reduce a likelihood that recording position displacement may occur by generating the recording signal, using the frequency-multiplied clock generated by the phase synchronizer, and to enhance stability and reliability on the recording position of the second information.

Further, in the optical disc recording device, assuming that dT is a length of the dummy data (where d is a positive integer, T is a channel clock length), and eT is a recording position displacement amount detected by the recording position displacement amount detector (where e is a positive integer, T is a channel clock length), preferably, the dummy data recording length controller may correct the recording length of the dummy data to $(d-e) \times T$ in the case where $d \geq e$, and may stop output of the recording signal that follows the dummy data for interruption of a recording operation in the case where $d<e$.

With the above arrangement, assuming that dT is a length of the dummy data (where d is a positive integer, T is a channel clock length), and eT is a recording position displacement amount detected by the recording position displacement amount detector (where e is a positive integer, T is a channel clock length), the dummy data recording length controller corrects the recording length of the dummy data to $(d-e) \times T$ in the case where $d \geq e$, and stops output of the recording signal that follows the dummy data for interruption of a recording operation in the case where $d<e$.

Thus, in the case where the recording length of dummy data is shorter than the recording position displacement amount, the recording operation is interrupted. This enables to prevent continuation of a recording position displacement state.

A recording signal generating device according to another aspect of the invention is a recording signal generating device in an optical disc recording device for recording second information different from first information in synchronism with a concave-convex mark by modulating a light intensity of a light beam to be irradiated onto a reflection film formed on the concave-convex mark, using a reproduction signal to be reproduced from an optical disc recorded with the first information in the form of the concave-convex mark for changing an optical characteristic of the reflection film. The recording signal generating device is adapted to generate a recording signal for controlling the modulation of the light intensity. A recording unit of the concave-convex mark includes a plurality of data areas in which the first information is recorded, and a plurality of linking areas, each of which is disposed between the adjacent ones of the data areas. The recording signal generating device includes a clock reproducer which reproduces a channel clock synchronized with a channel bit length of the concave-convex mark, using the reproduction signal; a signal processor which specifies a reproducing position in the concave-convex mark, using the reproduction signal, and using the channel clock reproduced by the clock reproducer; a recording signal generator which generates a recording signal alternately including a plurality of additionally recordable data, each of which includes the second information and has a predetermined length, and a plurality of dummy data; a recording position displacement amount detector which detects a recording position displacement amount representing a displacement amount between the reproducing position and a recording position of the additionally recordable data, using the reproducing position specified by the signal processor, and using the recording signal generated by the recording signal generator; and a dummy data recording length controller which increases or decreases a recording length of the dummy data in accordance with the recording position displacement amount detected by the recording position displacement amount detector.

With the above arrangement, the recording unit of the concave-convex mark includes a plurality of data areas in which the first information is recorded, and a plurality of linking areas, each of which is disposed between the adjacent ones of the data areas. The clock reproducer reproduces a channel clock synchronized with a channel bit length of the concave-convex mark, using the reproduction signal. The signal processor specifies a reproducing position in the concave-convex mark, using the reproduction signal, and using the channel clock reproduced by the clock reproducer. The recording signal generator generates a recording signal alternately including a plurality of additionally recordable data, each of which includes the second information and has a predetermined length, and a plurality of dummy data. The recording position displacement amount detector detects a recording position displacement amount representing a displacement amount between the reproducing position and a recording position of the additionally recordable data, using the reproducing position specified by the signal processor, and using the recording signal generated by the recording signal generator. The dummy data recording length controller increases or decreases a recording length of the dummy data in accordance with the recording position displacement amount detected by the recording position displacement amount detector.

Thus, it is possible to correct a displacement between a reproducing position of a reproduction signal from a concave-convex mark preformed in an optical disc, and a recording position of additionally recordable data to be recorded in synchronism with the reproduction signal, and to stably and speedily record second information.

The embodiments or the examples described in the detailed description of the invention are provided to clarify the technical contents of the invention. The invention should not be construed to be limited to the embodiments or the examples. The invention may be modified in various ways as far as such modifications do not depart from the spirit and the scope of the invention hereinafter defined.

INDUSTRIAL APPLICABILITY

The optical disc recording device and the recording signal generating device of the invention are capable of correcting displacement between the reproducing position of a reproduction signal from a concave-convex mark preformed in an optical disc, and the recording position of additionally recordable data to be recorded in synchronism with the reproduction signal, and capable of stably and speedily recording second information; and are applicable to e.g. an optical disc recording device and a recording signal generating device configured to additionally record individual information on a read-only optical disc, as well as to a commercial-use or industrial-use disc recorder using a large-capacity optical disc.

The invention claimed is:

1. An optical disc recording device for recording, on an optical disc recorded with first information in the form of a concave-convex mark, second information different from the first information, a recording unit of the concave-convex mark including a plurality of data areas in which the first information is recorded, and a plurality of linking areas, each of which is disposed between the adjacent ones of the data areas, the optical disc recording device comprising:
   a reproduction signal extractor which extracts a reproduction signal, based on reflected light from the concave-convex mark irradiated with a light beam;
   a clock reproducer which reproduces a channel clock synchronized with a channel bit length of the concave-convex mark, using the reproduction signal extracted by the reproduction signal extractor;
   a signal processor which specifies a reproducing position in the concave-convex mark, using the reproduction signal extracted by the reproduction signal extractor, and using the channel clock reproduced by the channel clock reproducer;
   a recording signal generator which generates a recording signal alternately including a plurality of additionally recordable data, each of which includes the second information and has a predetermined length, and a plurality of dummy data;
   a recorder which records the second information in synchronism with the concave-convex mark by modulating a light intensity of the light beam in accordance with the recording signal generated by the recording signal generator, and by irradiating the light beam of the modulated light intensity onto the optical disc for changing an optical characteristic of the optical disc;
   a recording position displacement amount detector which detects a recording position displacement amount representing a displacement amount between the reproducing position and a recording position of the additionally recordable data, using the reproducing position specified by the signal processor, and using the recording signal generated by the recording signal generator; and
   a dummy data recording length controller which increases or decreases a recording length of the dummy data in accordance with the recording position displacement amount detected by the recording position displacement amount detector.

2. The optical disc recording device according to claim 1, wherein
   the recording position displacement amount detector detects the recording position displacement amount by comparing between a recording end position of the additionally recordable data to be recorded in correspondence to the data area, and a leading position of the linking area immediately succeeding and adjacent to the data area, at a timing at which an output of the additionally recordable data of the predetermined length is ended, the additionally recordable data being included in the recording signal generated by the recording signal generator.

3. The optical disc recording device according to claim 1, wherein
   the recording signal alternately includes a first state signal corresponding to a first light intensity, in which an optical characteristic of the optical disc is not changed, and a second state signal corresponding to a second light intensity, in which an optical characteristic of the optical disc is changed, and
   at least a part of the dummy data is constituted of the first state signal.

4. The optical disc recording device according to claim 1, wherein
   the recording signal alternately includes a first state signal corresponding to a first light intensity, in which an optical characteristic of the optical disc is not changed, and a second state signal corresponding to a second light intensity, in which an optical characteristic of the optical disc is changed, and
   an output period of the second state signal is set to a period longer than a period corresponding to a maximum length of the concave-convex mark.

5. The optical disc recording device according to claim 1, wherein the recording signal alternately includes a first state signal corresponding to a first light intensity, in which an optical characteristic of the optical disc is not changed, and a second state signal corresponding to a second light intensity, in which an optical characteristic of the optical disc is changed, and the clock reproducer temporarily stops a phase control operation of a channel clock by interrupting a phase synchronizing operation of the reproduction signal at least during a period when a light beam of the second light intensity is irradiated, using the second state signal.

6. The optical disc recording device according to claim 1, wherein the recording signal alternately includes a first state signal corresponding to a first light intensity, in which an optical characteristic of the optical disc is not changed, and a second state signal corresponding to a second light intensity, in which an optical characteristic of the optical disc is changed, the signal processor includes an automatic gain controller which performs an automatic gain control operation to suppress amplitude variation of the reproduction signal, the automatic gain controller stops the automatic gain control operation of the reproduction signal at least during a period when a light beam of the second light intensity is irradiated, the clock reproducer reproduces the channel clock, using the reproduction signal to be controlled by the automatic gain controller, and the signal processor specifies the reproducing position, using the reproduction signal to be controlled by the automatic gain controller.

7. The optical disc recording device according to claim 1, wherein the recording signal alternately includes a first state signal corresponding to a first light intensity, in which an optical characteristic of the optical disc is not changed, and a second state signal corresponding to a second light intensity, in which an optical characteristic of the optical disc is changed, the signal processor includes a gain switcher which switches an amplitude gain of the reproduction signal in such a manner that an amplitude of the reproduction signal is lowered at least during a period when a light beam of the second light intensity is irradiated, the clock reproducer reproduces the channel clock, using the reproduction signal to be controlled by the gain switcher, and the signal processor specifies the reproducing position, using the reproduction signal to be controlled by the gain switcher.

8. The optical disc recording device according to claim 1, wherein the data area includes at least one synchronization pattern data, and at least one position information data, and the signal processor specifies the reproducing position, using the synchronization pattern data and the position information data detected based on the reproduction signal.

9. The optical disc recording device according to claim 1, further comprising:

a phase synchronizer which generates a frequency-divided clock obtained by dividing the channel clock reproduced by the clock reproducer by M (where M is a positive integer, and satisfies a relation: M>q, q is a parameter derived from a longest mark length qT (where T is a channel bit cycle) of a concave-convex mark), and which generates a frequency-multiplied clock, whose phase is synchronized with a phase of the generated frequency-divided clock, and which is obtained by multiplying the frequency-divided clock by N (where N is a positive integer of 2 or more), wherein the recording signal generator generates the recording signal, using the frequency-multiplied clock generated by the phase synchronizer.

10. The optical disc recording device according to claim 1, wherein assuming that dT is a length of the dummy data (where d is a positive integer, T is a channel clock length), and eT is a recording position displacement amount detected by the recording position displacement amount detector (where e is a positive integer, T is a channel clock length), the dummy data recording length controller corrects the recording length of the dummy data to $(d-e) \times T$ in the case where $d \geqq e$, and stops output of the recording signal that follows the dummy data for interruption of a recording operation in the case where $d<e$.

11. A recording signal generating device in an optical disc recording device for recording second information different from first information in synchronism with a concave-convex mark by modulating a light intensity of a light beam to be irradiated onto an optical disc, using a reproduction signal to be reproduced from the optical disc recorded with the first information in the form of the concave-convex mark for changing an optical characteristic of the optical disc, the recording signal generating device adapted to generate a recording signal for controlling the modulation of the light intensity, a recording unit of the concave-convex mark including a plurality of data areas in which the first information is recorded, and a plurality of linking areas, each of which is disposed between the adjacent ones of the data areas, the recording signal generating device comprising:

a clock reproducer which reproduces a channel clock synchronized with a channel bit length of the concave-convex mark, using the reproduction signal;

a signal processor which specifies a reproducing position in the concave-convex mark, using the reproduction signal, and using the channel clock reproduced by the clock reproducer;

a recording signal generator which generates a recording signal alternately including a plurality of additionally recordable data, each of which includes the second information and has a predetermined length, and a plurality of dummy data;

a recording position displacement amount detector which detects a recording position displacement amount representing a displacement amount between the reproducing position and a recording position of the additionally recordable data, using the reproducing position specified by the signal processor, and using the recording signal generated by the recording signal generator; and a dummy data recording length controller which increases or decreases a recording length of the dummy data in accordance with the recording position displacement amount detected by the recording position displacement amount detector.

* * * * *